(12) United States Patent
Mukerjee et al.

(10) Patent No.: US 9,186,653 B2
(45) Date of Patent: Nov. 17, 2015

(54) HIGHLY STABLE PLATINUM ALLOY CATALYST FOR METHANOL ELECTROOXIDATION

(75) Inventors: Sanjeev Mukerjee, Mansfield, MA (US); Qinggang He, Berkeley, CA (US); Nagappan Ramaswamy, Boston, MA (US)

(73) Assignee: Northeastern University, Boston, MA (US)

( * ) Notice: Subject to any disclaimer, the term of this patent is extended or adjusted under 35 U.S.C. 154(b) by 0 days.

(21) Appl. No.: 13/704,765

(22) PCT Filed: Jun. 17, 2011

(86) PCT No.: PCT/US2011/040886
§ 371 (c)(1),
(2), (4) Date: Dec. 17, 2012

(87) PCT Pub. No.: WO2011/160022
PCT Pub. Date: Dec. 22, 2011

(65) Prior Publication Data
US 2013/0089812 A1    Apr. 11, 2013

Related U.S. Application Data

(60) Provisional application No. 61/355,787, filed on Jun. 17, 2010.

(51) Int. Cl.
*H01M 4/90* (2006.01)
*B01J 23/52* (2006.01)
(Continued)

(52) U.S. Cl.
CPC ............. *B01J 23/52* (2013.01); *B82Y 30/00* (2013.01); *H01M 4/9083* (2013.01);
(Continued)

(58) Field of Classification Search
CPC .... H01M 4/921; H01M 4/926; H01M 4/8605
USPC ............................................ 429/524
See application file for complete search history.

(56) References Cited

U.S. PATENT DOCUMENTS

| 7,132,188 B2 | 11/2006 | Masel et al. |
| 7,208,439 B2 | 4/2007 | Zhong et al. |
| 7,855,021 B2 | 12/2010 | Adzic et al. |
| 7,871,955 B2 | 1/2011 | Cao et al. |
| 8,227,372 B2 | 7/2012 | Lopez et al. |

(Continued)

FOREIGN PATENT DOCUMENTS

| WO | WO 2008/025750 | * | 3/2008 |
| WO | WO2010033829 A1 | | 3/2010 |

OTHER PUBLICATIONS

Zhang et al. (J. Phys. Chem. B, vol. 109, No. 48, 2005, 22701-22704).*
Schrinner et al. (Macromol. Chem. Phys. 2007, 208, 1542-1547).*

*Primary Examiner* — Stewart Fraser
*Assistant Examiner* — Olatunji Godo
(74) *Attorney, Agent, or Firm* — Posternak Blankstein & Lund LLP

(57) ABSTRACT

A catalyst for use in at the anode of direct methanol fuel cells is made from nanoparticles having a core-shell structure. The core is an alloy of platinum and gold. The core is surrounded by a first shell of ruthenium and a second shell containing a ternary alloy of platinum, gold, and ruthenium. The catalyst can be made by a reverse-micelle method or by a single-phase scalable method. The catalyst is highly stable under conditions of use and resists dissolution of ruthenium or platinum.

21 Claims, 14 Drawing Sheets

(51) Int. Cl.
  *B82Y 30/00* (2011.01)
  *H01M 4/92* (2006.01)
  *H01M 8/10* (2006.01)
  *H01M 4/02* (2006.01)
  *B82Y 40/00* (2011.01)

(52) U.S. Cl.
  CPC ............ *H01M 4/921* (2013.01); *H01M 4/926* (2013.01); *B82Y 40/00* (2013.01); *H01M 8/1011* (2013.01); *H01M 2004/027* (2013.01); *Y02E 60/50* (2013.01); *Y02E 60/523* (2013.01); *Y10S 977/773* (2013.01); *Y10S 977/892* (2013.01)

(56) References Cited

U.S. PATENT DOCUMENTS

| | | | |
|---|---|---|---|
| 2007/0026292 A1* | 2/2007 | Adzic et al. | 429/44 |
| 2007/0031722 A1* | 2/2007 | Adzic et al. | 429/44 |
| 2007/0227300 A1* | 10/2007 | McGrath et al. | 75/255 |
| 2007/0270305 A1* | 11/2007 | Pak et al. | 502/172 |
| 2008/0044719 A1 | 2/2008 | Gorer et al. | |
| 2009/0162721 A1* | 6/2009 | Naohara et al. | 429/30 |
| 2010/0062929 A1* | 3/2010 | Virkar | 502/304 |
| 2010/0086832 A1* | 4/2010 | Lopez et al. | 429/44 |
| 2011/0091787 A1 | 4/2011 | McGrath et al. | |

* cited by examiner

HIGHLY STABLE PLATINUM ALLOY CATALYST FOR METHANOL ELECTROOXIDATION

CROSS REFERENCE TO RELATED APPLICATIONS

This application claims the priority of U.S. Provisional Application No. 61/355,787 filed Jun. 17, 2010 and entitled, PREPARATION OF HIGHLY STABLE PT-AU2RU/C CATALYST FOR METHANOL ELECTROOXIDATION, the whole of which is hereby incorporated by reference.

STATEMENT REGARDING FEDERALLY SPONSORED RESEARCH

The research leading to this invention was carried out with U.S. Government support provided under grants from Army Research Office Grant No. 47589-CH. The U.S. Government has certain rights in the invention.

BACKGROUND OF THE INVENTION

Direct-methanol fuel cells are a promising energy source for portable devices, and some breakthroughs have been made with regard to the fuel cell membrane and catalysts.

However, the efficiency of catalysts for methanol oxidation is still limited by CO poisoning, because CO is one of the carbonyl species formed during oxidation. Use of a PtRu alloy as the anodic catalyst for electrooxidation in direct methanol fuel cells has become state-of-the-art due to effective CO tolerance of this alloy. Nevertheless, a major obstacle to the successful application of the PtRu bimetallic catalyst is the dissolution of its metallic components. Ru dissolution in particular may cause detrimental effects such as severe decay of anodic activity and increase of the ohmic resistance. Also, dissolved Ru may penetrate the membrane and migrate to the cathode of a direct methanol fuel cell, where the oxygen reduction reaction (ORR) kinetics is badly inhibited in the presence of Ru even at micromolar concentrations. The dissolution of both Ru and Pt is caused mainly by the formation of oxidized species derived from water activation.

In an effort to enhance the stability of the PtRu catalyst, Zhang et al deposited Au clusters on a Pt catalyst through galvanic displacement of a Cu monolayer on Pt by Au. J. Zhang, K. Sasaki, E. Sutter, R. R. Adzic, Stabilization of Platinum Oxygen-Reduction Electrocatalysts Using Gold Clusters, Science 2007, 315, 220-222. The gold clusters helped to shift Pt oxidation potential to the positive, improving the stability of the catalyst. Other approaches to improving the stability of catalysts for methanol oxidation include PtRuNi ternary alloy and PtRuRhNi quaternary alloy nanoparticles, which exhibited enhanced electrocatalytic activity and better stability compared to a PtRu catalyst. J. Liu, J. Cao, Q. Huang, X. Li, Z. Zou, H. Yang, Methanol oxidation on carbon-supported Pt—Ru—Ni ternary nanoparticle electrocatalysts, J Power Sources 2008, 175, 159-165; K-W Park, J-H Choi, S-A Lee, C. Pak, H. Chang, Y-E Sung, PtRuRhNi nanoparticle electrocatalyst for methanol electrooxidation in direct methanol fuel cell, J. Catalysis 2004, 224, 236-242. However, there remains a need to develop new anodic catalysts with reduced dissolution of Ru and Pt, and synthetic methods for such catalysts, so as to improve the stability and performance of DMFC.

SUMMARY OF THE INVENTION

The invention provides a catalyst for use in electrochemical applications. The catalyst is particularly useful for direct methanol fuel cells, where it can serve at the anode to catalyze the electrooxidation of methanol. The catalyst is made from nanoparticles having a core-shell structure and containing an alloy of platinum, gold, and ruthenium. Platinum serves as the catalyst, while ruthenium prevents poisoning of the catalyst by CO, and gold stabilizes the catalyst by inhibiting the dissolution of ruthenium and platinum. The core is a nanoparticulate alloy of platinum and gold. In a preferred embodiment, the ratio of Pt:Au in the core particle is about 8:1. The core is surrounded by a first shell of ruthenium, which is in turn surrounded by a second shell containing an alloy of platinum, gold, and ruthenium. In a preferred embodiment, the overall composition of the core-shell nanoparticle is about 8:8:1 for Pt:Ru:Au. Also preferred is an embodiment in which the second shell alloy has a ratio of Pt:Ru:Au of about 8:3:6. The core-shell nanoparticle is attached to a solid support, such as a carbon particle, for use as a fuel cell catalyst.

Another aspect of the invention is a reverse micelle method for making a core-shell platinum alloy nanoparticulate catalyst. In step (a) of the method, a first aqueous solution comprising a salt or complex of platinum and a salt or complex of gold is provided. In step (b), an aliquot of the first aqueous solution is injected into a nonpolar solution comprising a surfactant dissolved in a nonpolar solvent, to form an emulsion comprising reverse micelles. In step (c), a second aqueous solution is added to the emulsion. The second aqueous solution comprises a reducing agent, which causes the platinum and gold become reduced and form core nanoparticles containing a platinum-gold alloy. As a result, the emulsion is converted to a colloidal sol. In step (d) a third aqueous solution comprising a salt or complex of ruthenium is added to the colloidal sol. In step (e) a fourth aqueous solution comprising a reducing agent is added to the colloidal sol resulting from step (d). The ruthenium becomes reduced and forms a first shell of ruthenium surrounding the core nanoparticles of platinum-gold alloy, producing a suspension of core-shell nanoparticles, each comprising a platinum-gold alloy core and a ruthenium first shell. In step (f), a suspension of carbon particles in the nonpolar solvent is added to the nanoparticle suspension. In step (g), a solvent, such as acetone, is added to the product of step (f) causing the dissolution of the reverse micelles and attachment of the core-shell nanoparticles to the carbon particles, resulting in a single-phase suspension of carbon-supported core-shell nanoparticles is formed. In step (h), the carbon-supported core-shell nanoparticles are collected by filtration and washed. Finally, in step (i) the catalyst particles are annealed by heating at 100 to 400° C. During the annealing process, platinum and gold atoms migrate from the core towards the surface of the first shell to form a second shell, which includes a ternary alloy of ruthenium, platinum, and gold. The second shell surrounds the first shell, and stabilizes the ruthenium and platinum in the first shell and the core against dissolution.

Yet another aspect of the invention is a scalable method for making a core-shell platinum alloy nanoparticulate catalyst. In step (a) of the method, an aqueous suspension of carbon support particles is provided. The suspension contains a salt or complex of platinum and a salt or complex of gold. In step (b) a reducing agent is added to the suspension, and the platinum and gold become reduced to form core nanoparticles of platinum-gold alloy attached to the carbon support particles. In step (c) the core nanoparticles are resuspended in an aqueous medium. In step (d), a salt or complex of ruthenium is added to the suspension of core nanoparticles from step (c). In step (e) a reducing agent is added to the suspension, causing the reduction of ruthenium to form a first shell of ruthenium surrounding the core nanoparticles. The result is a suspension of carbon-supported core-shell nanoparticles comprising a platinum-gold alloy core and a first shell of ruthenium. In step (f) the carbon-supported core-shell nanoparticles are collected by filtration and washed. Finally, in step (g) the catalyst particles are annealed by heating at 100 to 400° C. During the annealing process, platinum and gold atoms migrate from the core towards the surface of the first shell to form a second shell, which includes a ternary alloy of ruthenium, platinum, and gold. The second shell surrounds the first shell, and stabilizes the ruthenium and platinum in the first shell and the core against dissolution.

BRIEF DESCRIPTION OF THE DRAWINGS

In FIGS. 5(a)-5(c), Pt, Ru and Au atoms are represented by light gray (and larger diameter), dark gray (smaller diameter), and white spheres, respectively.

DETAILED DESCRIPTION OF THE INVENTION

Figure 1:
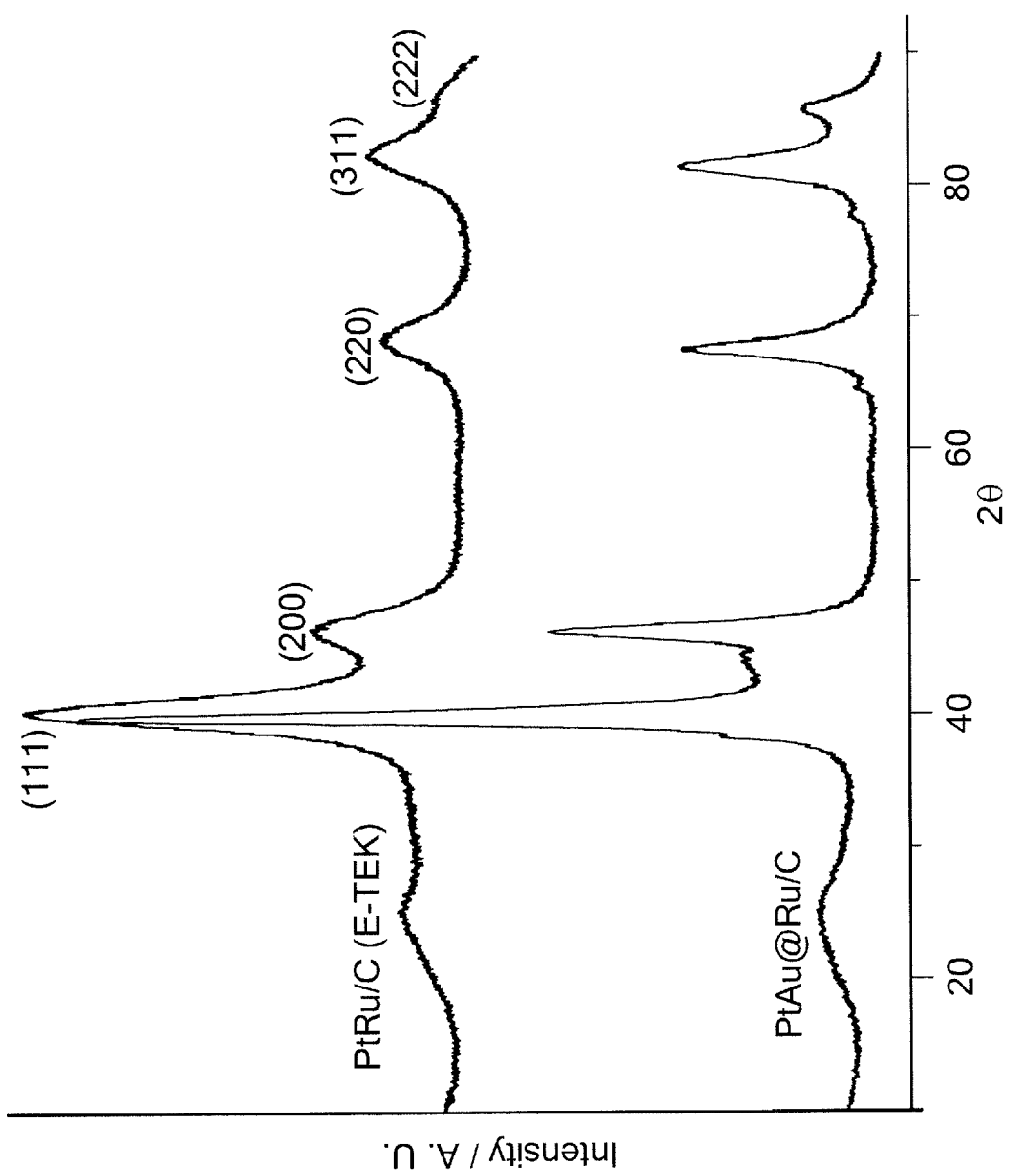
FIG. 1 shows XRD patterns from PtRu/C (E-TEK, 60%), PtAu@Ru/C (60%, prepared by the microemulsion method).

The invention relates to a core-shell platinum alloy nanoparticulate catalyst and methods of making the catalyst. The catalyst is useful for catalysis at the anode of fuel cells, where CO poisoning needs to be avoided. In particular, the catalyst is very advantageous for the electrooxidation of methanol in direct methanol fuel cells due to its high activity and excellent stability under fuel cell operating conditions.

The catalyst is an improvement over the PtRu catalysts that have heretofore been used in direct methanol fuel cells. PtRu catalysts offer good resistance to CO poisoning, but suffer from poor stability due to dissolution and loss of Pt and Ru from the catalyst under operating conditions. The structure of the catalyst is that of nanoparticles having a layered structure, specifically a core structure surrounded by two shells that modify the catalytic properties of the core and stabilize the catalyst composition. Catalytic activity is still provided by platinum, and ruthenium still prevents poisoning of the catalyst by CO. However, Pt is alloyed with Au in order to stabilize both Pt and Ru and prevent their conversion to soluble ionic species during use.

The structure and architecture of the catalyst nanoparticles is different from previous PtRu catalysts. At the core is an alloy of platinum and gold in nanoparticulate form. The ratio of Pt:Au in the core particle can be from about 1:2 to is about 10:1, or preferably about 1:1 to about 8:1; more preferably it is about 8:1. The core particle may contain other elements; however, it preferably consists of or consists essentially of Pt and Au. The core particle has a diameter in the low nanometer range, preferably about 1.5 to about 3 nm. The core is surrounded by a first shell of ruthenium, which is added to the core particles by sequential synthesis. The first shell can also contain other elements, but preferably the first shell consists of or consists essentially of Ru. The first shell has a thickness in the low nanometer range, and preferably is about 1.5 to about 3 nm. While the catalyst nanoparticles can be prepared with only the core particle and first shell, further improvement in stability is provided by adding a second shell surrounding the first shell. The second shell, which forms the surface of the particle, contains a ternary alloy of platinum, gold, and ruthenium. The second shell can be formed during an annealing process in which the particles are heated and Pt and Au atoms from the core diffuse outward towards the surface of the particle, forming the ternary alloy in a surface layer that forms the second shell. The thickness of the second shell is about 0.1 nm to about 2 nm. The ternary alloy of the second shell contains Pt, Ru, and Au at a Pt:Ru:Au ratio from about 2:2:1 to about 8:8:1; in a preferred embodiment it is about 8:3:6. The overall composition of the core-shell nanoparticles as a whole (including the core, first shell, and second shell) is Pt:Ru:Au at a ratio from about 1:1:1 to about 10:10:1; preferably it is about 8:8:1. The overall ratio of Pt:Ru can vary from about 2:1 to about 1:8, and preferably it is about 1:1. The core-shell nanoparticle can be attached to a solid support, such as a carbon particle, for use as a fuel cell catalyst.

Figure 5A:
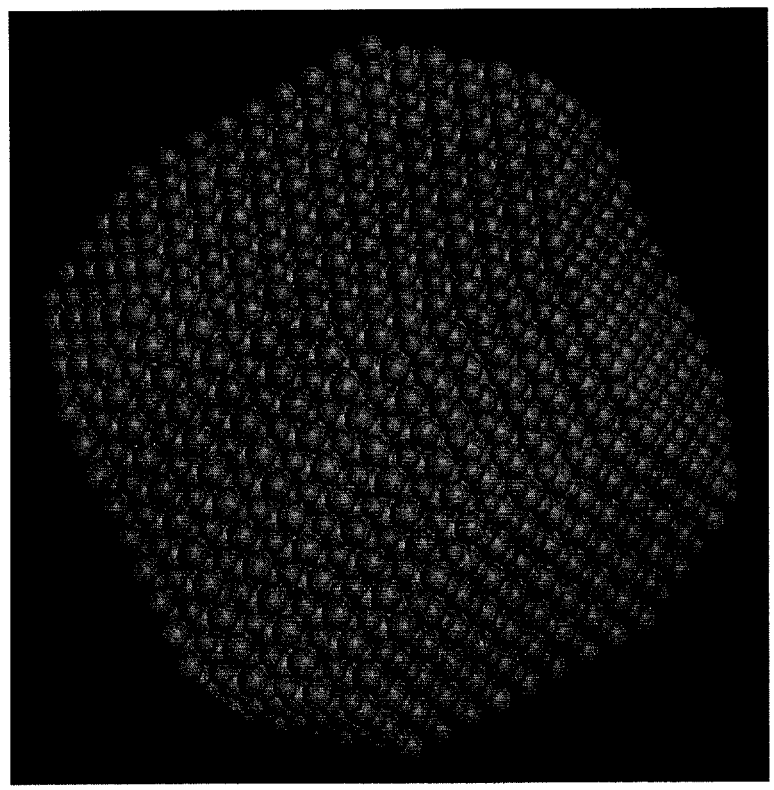
FIG. 5(a) shows a modeled structure of a commercial PtRu/C nanoparticle.
Figure 5B:
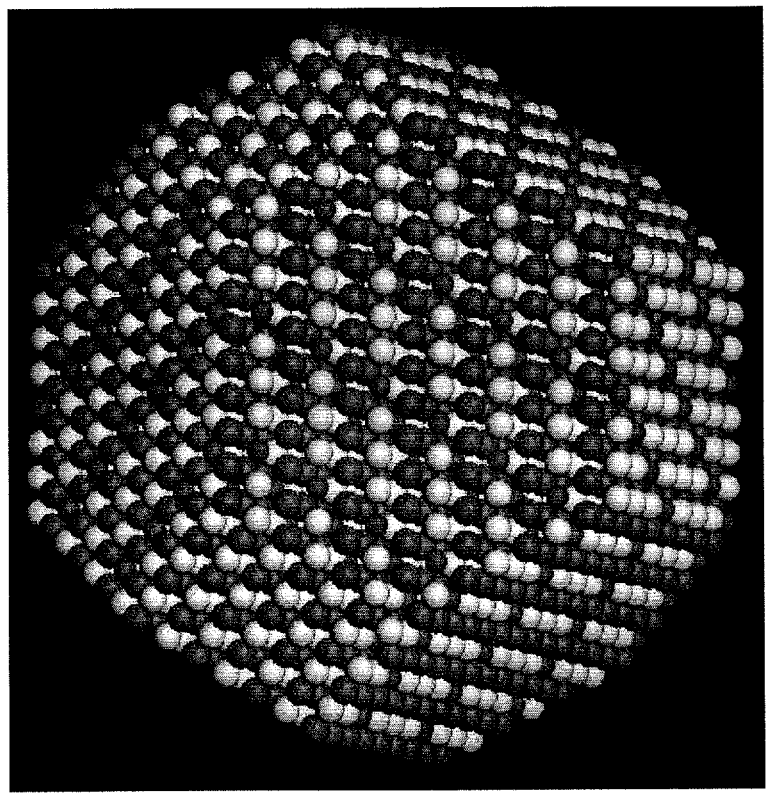
FIG. 5(b) shows a perspective view of a modeled structure of a PtAu@Ru/C nanoparticle.
Figure 5C:
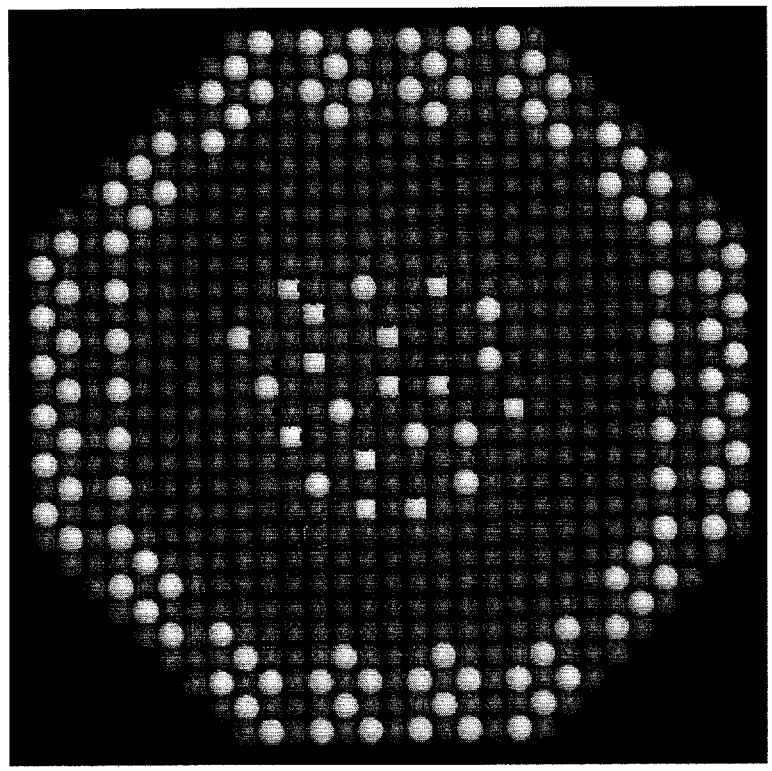
FIG. 5(c) shows a cross-sectional view of the PtAu@Ru/C model.
Figure 5D:
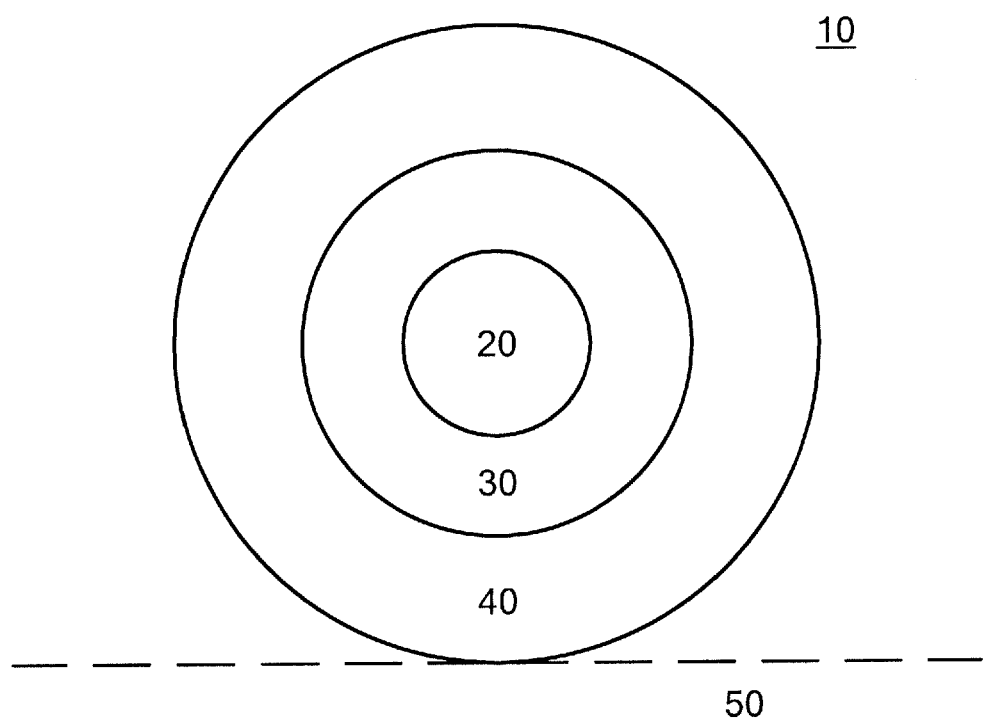
FIG. 5(d) is a diagram of the cross-sectional structure of a core-shell nanoparticle attached to a support particle.

A structural model of the nanoparticle portion of the catalyst of the present invention (PtAu@Ru) has been prepared based on information from the XRD, XPS, EXAFs, TEM, and Cu UPD data described in the Examples, and is presented in FIGS. 5(b)-5(c). Referring to FIG. 5(d), which is a diagram based upon the model as shown in FIG. 5(c), catalyst nanoparticle 10 has a core-shell structure with a distinct core (20) and two distinct shells (first shell 30, second shell 40), and is bound to support particle 50. The core structure (20) consists of a PtAu alloy in the form of a solid solution, which is formed during the initial stage of synthesis, before forming the Ru shell. The first shell (30) surrounding the core contains bulk Ru, formed during the second stage of synthesis. The outer or second shell (40) contains a PtRuAu ternary alloy formed by diffusional transport of metal atoms during the heat treatment, which is performed during the third stage of synthesis. The second shell is more enriched with Pt and Au than with Ru. This particular spatial distribution of Pt, Ru, and Au is responsible for the excellent catalytic activity for methanol oxidation and high stability of Pt and Ru during the electrochemical characterization, and during fuel cell operation.

Since no Au peaks were observed in the XRD pattern of the PtAu@Ru/C catalyst (FIG. 1), the Au in the catalyst is believed to be in solid solution and has an amorphous, rather than crystalline, structure. Adding Au clusters to the surface of PtRu nanoparticles, as practiced by others, was shown to decrease the oxidation of Pt in the nanoparticles. See Liang et al., J. Power Sources 185:166-170 (2008). However, in the PtAu@Ru/C catalyst according to the present invention, Au is alloyed with Pt in the Pt-enriched core as well as in the second (outer) shell containing Pt, Ru, and Au, and thereby prevents oxidation at relatively low potentials.

The catalyst can be used in the form of a metallic powder or attached to a support, which can optionally be a porous support. When attached to a support, the catalyst particles are generally attached to the surface of the support. The catalyst is usually not present as a complete or contiguous layer on the surface but would occupy a fraction of the surface, such as 10%, 20%, 40% or more. Suitable support materials include carbon black, ceramic materials, and metal oxides such as aluminum oxide, titanium dioxide, zirconium dioxide, silicon dioxide, tungsten oxide, and molybdenum oxide. Carbides and nitrides of transition metals are also suitable as substrates. In fuel cell applications, the support should be electrically conductive, and carbon black (e.g., Vulcan XC72 or Ketjen black EC300), graphite, or carbon nanotubes are preferred. The support can be in the form of particles, so as to increase the surface area of the catalyst. Support particles can have an average particle size in the range, for example, of 50 nm to 100 μm, and preferably are in the range of from about 50 nm to about 100 nm, about 100 nm to about 1000 nm, or about 1 to 5 microns.

The catalyst is useful as a coating for electrodes. An electrode coating can be prepared by any known method. Typically, a catalyst ink is prepared by suspending a dry powder of the catalyst in a solvent, e.g., a polar solvent that is readily evaporated, such as an alcohol (e.g., isopropanol). The ink is distributed over the surface to be coated and dried to form a catalyst-coated surface. Optionally, the coated surface can be stabilized by adding a binder. A polymer that does not interfere with the electrochemistry at the electrode surface can be used as the binder. For example, Nafion® (DuPont), a copolymer of tetrafluoroethylene with perfluoro-3,6-dioxa-4-methyl-7-octenesulfonic acid, can be used as the binder. A thin film of Nafion® can be applied over the catalyst by diluting a Nafion® stock suspension with water, depositing the diluted suspension over the adhered catalyst, and drying. Nafion® films or membranes are permeable to water and highly conductive to hydrogen ions, rendering them useful in fuel cells.

The catalyst has application in different types of fuel cells, particularly in direct methanol fuel cells. The properties of the catalyst make it ideal for any electrochemical application where there is a need to oxidize a hydrocarbon fuel at the anode, including methanol and ethanol electrolyzers.

The inventors have developed two different methods for preparing a catalyst according to the invention. The first method is a reverse micelle method, in which nanoparticles are formed and the shell layers built up in polar phase microdroplets suspended in a nonpolar phase and stabilized by surfactant. The synthesis is carried out in three phases. In the first phase, the core structure is formed by reducing Pt and Au. In the second phase, the first shell is added to the core particles by reducing Ru in the presence of the particles. After the nanoparticles having a core and first shell (PtAu@Ru) are synthesized, the two phase micellar system is broken using a polar solvent, such as acetone, in the presence of support particles, such as carbon black. The nanoparticles then adhere to the carbon black particles. In the third phase of synthesis, the nanoparticles adhered to carbon (PtAu@Ru/C) are heat treated, during which the second shell is formed.

In step (a) of the reverse micelle method, a first aqueous solution comprising a salt or complex of platinum and a salt or complex of gold is provided. In step (b), an aliquot of the first aqueous solution is injected into a nonpolar solution comprising a surfactant dissolved in a nonpolar solvent, to form an emulsion comprising reverse micelles. In step (c), a second aqueous solution is added to the emulsion. The second aqueous solution comprises a reducing agent, which causes the platinum and gold become reduced and form core nanoparticles containing a platinum-gold alloy. As a result, the emulsion is converted to a colloidal sol. In step (d) a third aqueous solution comprising a salt or complex of ruthenium is added to the colloidal sol. In step (e) a fourth aqueous solution comprising a reducing agent is added to the colloidal sol resulting from step (d). The ruthenium becomes reduced and forms a first shell of ruthenium surrounding the core nanoparticles of platinum-gold alloy, producing a suspension of core-shell nanoparticles, each comprising a platinum-gold alloy core and a ruthenium first shell. In step (f), a suspension of carbon particles in the nonpolar solvent is added to the nanoparticle suspension. In step (g), a solvent, such as acetone, is added to the product of step (f) causing the dissolution of the reverse micelles and attachment of the core-shell nanoparticles to the carbon particles, resulting in a single-phase suspension of carbon-supported core-shell nanoparticles is formed. In step (h), the carbon-supported core-shell nanoparticles are collected by filtration and washed. Finally, in step (i) the catalyst particles are annealed by heating at 100 to 400° C. During the annealing process, platinum and gold atoms migrate from the core towards the surface of the first shell to form a second shell, which includes a ternary alloy of ruthenium, platinum, and gold. The second shell surrounds the first shell, and stabilizes the ruthenium and platinum in the first shell and the core against dissolution.

Further details of the procedure for preparing a core-shell Pt/Au/Ru nanoparticulate catalyst using a microemulsion method are as follows. A reverse micelle system can be prepared using a solution of a surfactant (e.g., AOT) in a nonpolar solvent such as cyclohexane. The polar phase contains the required amounts of salts or complexes of the metals needed to form the core particle (e.g., 0.25M $H_2PtCl_6$ and 0.25M $AuCl_3$). The reverse micelle system is then mixed with another reverse micelle system containing 1M $NaBH_4$ in the polar phase. The metal salts are reduced to form metal alloy nanoparticles within a few minutes. Continuous stirring for another 4 hours is performed to ensure nucleus formation and crystal growth. This completes the formation of the core particles, after which a shell layer containing metallic Ru is added to the core particles. To form the shell, a microemulsion system containing RuCl$_3$ is introduced to the PtAu core particles, and again reduced using NaBH$_4$. The ratio of metals used is the same as the ratio desired, such as about 8:8:1 for Pt:Ru:Au. The core-shell catalyst nanoparticles can then be washed with cyclohexane, acetone, ethanol, and water (in that order, i.e., in order of increasing polarity) and dried, e.g., in vacuum at 80° C. for 24 hours. A final annealing process is performed by heat treatment at 100-400, with treatment at 220° C. preferred. Heat treatment can be performed under flowing H$_2$/Ar (5% H$_2$, 95% Ar) for several hours, e.g., for about 6 hours.

In order to form a platinum alloy catalyst by a micellar process, core nanoparticles are first formed in droplets of a polar phase, composed of one or more polar solvents, suspended in a nonpolar phase composed of one or more nonpolar solvents. Any nonpolar solvent can be used that permits formation of a microemulsion with the polar solvent. Suitable polar solvents include water and short chain alcohols, while suitable nonpolar solvents include cyclohexane, hexane, toluene, 1-methyl-2-pyrrolidone, and ethers. The polar and nonpolar solvents are selected such that the polar and non-polar phases are immiscible and form a microemulsion, with small droplets of the polar phase suspended in the nonpolar phase. The size of the droplets can be adjusted by selecting or manipulating the surface tension of the droplets, or by mechanically dispersing the polar phase in the nonpolar solvent, such as by sonication or rapid mixing. Preferably, the droplets have a size in the nanometer range, such as from about 10 nm to about 1000 nm, or extending into the micrometer range, such as up to 100 μm in diameter. The size of the droplets can influence the size of the resulting catalyst particles by determining the size of the pool of metal atoms available to form a single nanoparticle. The metal compounds that form the alloy can be present in covalent, ionic or complexed form. The metals are induced to form metallic nanoparticles by reduction, through the addition of a reducing agent to the microemulsion. The reduction reaction can be supported by adjusting the conditions as appropriate, such as by raising the temperature of the microemulsion or adding agents to adjust the pH to a desired range.

A platinum compound, such as one or more salts or complexes soluble in the polar phase, and one or more compounds containing other transition metals are injected or otherwise mixed into the nonpolar phase to form the microemulsion. Injection conditions are selected so as to achieve a uniform population of microdroplets. For example, the polar phase containing the metal compounds can be added during sonication or mixing. The polar phase assumes the form of small pools or microdroplets containing the metal compounds, and the droplets are suspended in the nonpolar phase to form the microemulsion. Suitable metal salts or complexes include chlorides, nitrates. In some embodiments the platinum, gold, or ruthenium is supplied as a metal-organic complex, such as a carbonyl complex. The metal-organic complex can be formed by liganding the metal ion to any of a variety of organic compounds including olefins, such as dimethyloctadiene; aromatics, such as pyridine; 2,4-pentanedione; or acetyl acetonate. The use of acetyl acetonate is advantageous, as this compound can be thermally decomposed during heat activation of the catalyst, leaving a pure catalyst with high performance. Both organic and inorganic compounds containing platinum and other transition metals as described above can be obtained commercially; monohydrate and other hydrated forms are preferred.

Either before or after reduction of the metals, one or more appropriate surfactants can be added to form reverse micelles, i.e., surfactant-coated polar phase microdroplets suspended in the nonpolar phase. The surfactant can protect the reductant, usually zero valent metal, from sintering. Suitable surfactants and co-surfactants include sodium dioctyl sulfosuccinate, 1-butanol, aliphatic acetic acid moieties. Surfactant can be added to the polar phase before it is added to the nonpolar phase, or surfactant can be added to an already formed microemulsion to form the reverse micelles.

A reducing agent is added to the microemulsion to reduce platinum and the alloying metal(s) to metallic form. In some steps two or more metals (e.g., platinum and gold) are reduced simultaneously, i.e., in the presence of one another, forming a uniform conglomerate or alloy of the metals. In other steps, a single metal (e.g., ruthenium) is reduced, forming a homogeneous layer. Suitable reducing agents include glacial acetic acid and sodium borohydrate. The product of the initial reduction step is a colloidal sol containing a platinum-gold alloy in nanoparticulate form, where the nanoparticles of metal alloy are coated or encapsulated with one or more surfactants. Further details of reverse micelle methods for synthesizing platinum alloy catalysts can be found in Qian et al., J. Phys. Chem. C (2008), 112, 1146-1157.

Formation of the micellar structure and reduction can be conducted conveniently at or near room temperature. Subsequent binding of the nanoparticles with carbon also can be carried out at or near room temperature. Adherence of the catalyst to a carbon support is carried out using a protocol to break the micelles in the presence of the carbon support particles. This is conducted with an appropriate addition of solvents such as acetone, dimethyl formamide, or dimethyl acetate, which disrupt the micelle structure. This is subsequently followed with a careful washing (e.g., using deionized water) and the heat treatment step. The heat treatment can utilize a step and plateau profile with ramps of, for example, 5 to 50° C./hr, covering a temperature range from about 150 to about 1000° C. and including one or more plateaus of 30 to 90 minutes. A tube furnace can be used having an atmosphere containing a mixture of H$_2$/N$_2$, H$_2$Ar, or pure Ar.

The second method of making the catalyst is a method that does not utilize a microemulsion, but is carried out in a single phase system. This method is easier to practice at larger volumes and can be scaled up as desired. In step (a) of the scalable method, an aqueous suspension of carbon support particles is provided. The suspension contains a salt or complex of platinum and a salt or complex of gold. In step (b) a reducing agent is added to the suspension, and the platinum and gold become reduced to form core nanoparticles of platinum-gold alloy attached to the carbon support particles. In step (c) the core nanoparticles are resuspended in an aqueous medium. In step (d), a salt or complex of ruthenium is added to the suspension of core nanoparticles from step (c). In step (e) a reducing agent is added to the suspension, causing the reduction of ruthenium to form a first shell of ruthenium surrounding the core nanoparticles. The result is a suspension of carbon-supported core-shell nanoparticles comprising a platinum-gold alloy core and a first shell of ruthenium. In step (f) the carbon-supported core-shell nanoparticles are collected by filtration and washed. Finally, in step (g) the catalyst particles are annealed by heating at 100 to 400° C. During the annealing process, platinum and gold atoms migrate from the core towards the surface of the first shell to form a second shell, which includes a ternary alloy of ruthenium, platinum, and gold. The second shell surrounds the first shell, and stabilizes the ruthenium and platinum in the first shell and the core against dissolution.

The catalyst can be produced in a batch or continuous process. A continuous annealing process can be carried out in a continuously operated furnace such as a rotary kiln or belt calciner.

A catalyst according to the invention possesses improved electrochemical activity compared with earlier catalysts made from alloys containing platinum and ruthenium. A catalyst according to the present invention also has better resistance to dissolution of both Ru and Pt. While not intending to limit the invention to any particular theory or mechanism, it is believed that the presence of gold raises the oxidation potential of both Pt and Ru, thereby increasing the energy required to convert them to soluble ionic form. The effect of gold in stabilizing is increased by the structure of the catalyst particles. The improved stability of the catalyst under conditions of use can be assessed, as shown in the examples, by continuous electrochemical operation for a period of time (e.g., 24 hours or more in an electrochemical cell), followed by analysis of the electroactive surface area using Cu UPD measurements (see Example 10). A catalyst according to the invention preferably will retain at least 98% of its electroactive surface area after 24 hours of electrochemical operation at a constant anodic overpotential in the range from 0.5 to 0.6 V as measured against a reference hydrogen electrode. Alternatively, a catalyst according to the invention preferably will retain at least 98% of its electroactive surface area after 24 hours of electrochemical operation with potential cycling between 0.05 and 1.1 V as measured against a reference hydrogen electrode. Dissolution of Ru from the catalyst also can be detected by the appearance of dissolved Ru ions in the anode fuel stream. Thus, a catalyst according to the present invention preferably will have a concentration of dissolved Ru in the anode fuel stream of less than 1 µM.

EXAMPLES

Example 1

Synthesis of Core-Shell Platinum Alloy Nanoparticles by a Microemulsion Method

Catalyst synthesis was carried out under an argon atmosphere using a Schlenk line technique. All the chemicals were ACS reagent grade and purchased from Sigma Aldrich.

The micelle suspensions were made from a surfactant (sodium dioctyl sulfosuccinate (AOT)), an oil phase (cyclohexane), and an aqueous phase (a solution of chloroplatinic acid ($H_2PtCl_6.6H_2O$) and chloroauric acid ($HAuCl_4.3H_2O$)). The reducing agent for the synthesis was sodium borohydride, which was added to the reaction medium in the form of another reverse micelle suspension.

The synthesis of core-shell Pt alloy nanoparticles by the reverse micelle method was a sequential procedure including two major steps. In the first major step, core particles of a PtAu alloy was prepared by a reverse micelle method, while in the second major step, an aqueous solution of ruthenium trichloride ($RuCl_3.xH_2O$) was added to make a reverse micelle preparation of $RuCl_3$ in AOT-cyclohexane. The reverse micelles of $RuCl_3$ were reduced by another reverse micelle preparation containing sodium borohydride, forming reduced metallic ruthenium which decorated the core of PtAu alloy, forming a shell around the core particles. At the end of the synthesis the reverse micelles were broken by the controlled addition of acetone.

The reaction procedure to form the core particles was as follows. An 18.7 g amount of AOT was dissolved in 194 ml of cyclohexane to prepare a 0.2M AOT solution. 1.01 ml of $H_2PtCl_6.6H_2O$ and 127 µl of $HAuCl_4.3H_2O$ were mixed together and the mixture added into 35 ml of 0.2M AOT solution, followed by sonication for 30 minutes. Separately, 2.28 ml of 0.625 mol/L $NaBH_4$ solution was prepared and added into 70 ml of 0.2M AOT solution, with stiffing for at least 45 minutes. The reverse micelle preparation containing sodium borohydride was slowly added into the microemulsion containing the solution of chloroplatinic acid and chloroauric acid. An immediate color change of the mixture confirmed the formation of nanoparticles.

To synthesize the core-shell PtAu@Ru nanoparticles, a separate reverse micelle suspension containing ruthenium chloride was prepared by adding 1.69 ml of 0.15M $RuCl_3$ into 52 ml of 0.2M AOT-cyclohaxne. The resulting microemulsion containing ruthenium salt was sonicated for at least 30 minutes and then slowly added into the black colored microemulsion containing PtAu core nanoparticles. A reducing microemulsion of sodium borohydride was prepared by adding 1.69 ml of 0.75M $NaBH_4$ into 52 ml of 0.2M AOT solution, stiffing for at least 45 minutes, and sonicating for another 45 minutes. The microemulsion ofسodium borohydride was slowly added into the reaction medium, and the whole suspension was stirred for at least 4 hours. The final suspension of core-shell PtAu@Ru nanoparticles was black in color.

Example 2

Preparation of Carbon-Supported PtAu@Ru Catalyst

Ketjen carbon black (BET surface area of 800 $m^2/g$) was dried at 100° C. in a high vacuum oven before using. The dried Ketjen carbon (0.054 g) was dispersed in 50 ml of cyclohaxane by sonication for 30 minutes and then added slowly to a reaction vessel containing PtAu@Ru nanoparticles. The whole suspension was stirred overnight. To break the reverse micelles, 180 ml of acetone was slowly added into the reaction vessel under constant stirring for 4 hours. Caution was taken to control the addition of acetone, using a rate of about 8 ml/min, to avoid the abrupt disruption of micelles and agglomeration of nanoparticles. After 4 hours of stiffing, the solution was kept undisturbed for 2 hours, and then the precipitate was filtered using filter paper having a sub-micrometer pore size (e.g., a 0.22 µm pore size Millipore filter). The precipitate was washed with at least 150 ml of acetone to remove the excess surfactant, followed by successive washes with 100 ml of ethanol and at least 300 ml of distilled water. The washed filtrate was dried at 80° C. overnight under vacuum. The final heat treatment (annealing) step was performed in hydrogen/argon (5% $H_2$) gas at a ramp rate of 5° C. $min^{-1}$ to a temperature of 220° C. and incubated at that temperature for 6 hours.

Example 3

Large-Scale Synthesis of Core-Shell Platinum Alloy Nanoparticulate Catalyst

A large scale method was developed for making carbon supported core-shell platinum-gold-ruthenium (PtAu@Ru) nanoparticles. The method involved a sequential multi-step process. In the first step, platinum-gold alloy core particles were prepared. In the second step, the PtAu nanoparticles were used as the nucleation sites for adding a third metal, ruthenium, which formed a shell surrounding the PtAu core particles.

In the first step, Ketjen Black carbon was heat treated under vacuum for 8 hours at 110° C. The carbon powder was then cooled to room temperature. In a 250 ml beaker, 200 mg of the heat treated carbon was added to 50 ml of water and sonicated for 30 minutes. In a separate beaker, 1 ml of a 0.81 M solution of chloroplatinic acid $H_2PtCl_6.6H_2O$ and 1 ml of 0.091 M solution of chloroauric acid were mixed together. The metal salt solution was added into the suspension of carbon powder, which was then stirred for half an hour to obtain a homogeneous mixture. In a separate beaker, an aqueous solution of 1 ml of 1.35 M (50 mg) sodium borohydride solution was prepared. The freshly prepared borohydride solution was slowly added into the carbon mixture containing the metal salt and stirred for 2 hours. The reducing agent slowly reduced the metal salt mixture, and platinum-gold alloy core nanoparticles were nucleated on the high active surface area-carbon particles.

In the second step, ruthenium was reduced onto the already synthesized gold-platinum alloys. 1 ml of an aqueous solution of 1.39 M ruthenium trichloride was added into the gold-platinum carbon mixture, and then the mixture was stirred for 30 minutes in order to homogeneously distribute the $Ru^{3+}$ on the carbon support and on the platinum-gold core particles. Then, 1 ml of a freshly prepared aqueous solution of 4.2 M sodium borohydride was slowly added to the mixture, which was stirred for another 2 hours. The final mixture was allowed to stand for at least 1 hour for settlement and then filtered using a sub-micrometer pore-sized membrane filter (0.22 μm pore sized Millipore filter). The precipitate was collected and dried under vacuum overnight. A final heat treatment annealing step was performed in hydrogen/argon (5% $H_2$) gas at a ramp rate of 5° C. $min^{-1}$ to a temperature of 220° C., followed by incubation at that temperature for 6 hours. This protocol is designed for about 500 mg of sample preparation; however, it can be scaled up to produce larger amounts as desired.

Example 4

Characterization of Catalyst Structure and Composition

Powder X-ray diffraction (XRD) patterns of the catalysts were taken on a Rigaku X-ray Diffractometer with CuKα radiation. An incident beam of X-rays of wavelength 1.5418 Å ($CuK_\alpha$) filtered by a nickel filter was used. The particle size of the dispersed metal crystallites was estimated from the broadening of diffraction peaks using the Scherrer formula.

The morphology and particle size distribution of the catalysts were examined using a JEOL 2010 Advanced High Performance transmission electron microscope (TEM). The facility is capable of an ultimate point-to-point resolution of 0.19 nm.

The composition of catalysts was analyzed by VG Elemental Plasmaquad-2 (PQ2) ICP-MS. The results are presented in Table 1.

TABLE 1

| Catalyst | Composition from ICP analysis | | Crystallite Size (nm) | | Initial Overall ECA ($m^2/g$) | Initial surface composition |
| --- | --- | --- | --- | --- | --- | --- |
| | Pt Wt % | Pt:M (atomic) | XRD | TEM | Cu UPD | XPS |
| PtRu/C (E-TEK 60%) | 39.0 | 1:1 | 4.0 | 2.2 | 66.7 | 6:4 (Pt:Ru) |
| $Pt_8Au@Ru_8$/C (60%, microemulsions) | 34.7 | 8.33:7.72:1 (Pt:Ru:Au) | 7.1 | 4.1 | 54.7 | 8:3:6 (Pt:Ru:Au) |

TABLE 2

| | Change in overall ECA (−%) | Increased Pt coverage (+%) | Initial Pt coverage (%) |
| --- | --- | --- | --- |
| PtRu/C (E-TEK), room T, 24 hours | 11.9 | 4.9 | 69.4 |
| PtRu/C (E-TEK), at 50° C., 4 hours | 11.3 | 7.3 | 69.5 |
| PtAu@Ru/C (micro-emulsion), room T, 24 hours | 1.7 | 2.0 | 74.4 |
| PtAu@Ru/C (micro-emulsion), at 50° C., 4 hours | 0.5 | 1.7 | 75.7 |

Example 5

Electrochemical Measurements

All electrochemical experiments were performed using a conventional three-electrode cell. A glass compartment accommodated the interface between the electrolyte and hydrogen gas at a Pt mesh, which served as a sealed hydrogen reference electrode. The RHE was connected to the main cell compartment through a fine pore sized frit that impeded the transport of $Ru^{n+}$ species. A Pt wire of ca. 1.7 $cm^2$ electroactive surface area (measured from the hydrogen underpotential deposition ($H_{UPD}$) charge) was used as counter electrode. The instrumentation was based on an ASAFR Rotator (Pine Instruments Company, USA), and an Autolab PGSTAT-30 potentiostat equipped with a SCAN-GEN module (Eco Chemie B.V., The Netherlands). All measured electrode potentials refer to the RHE potential scale.

Cu under potential deposition (UPD) was used to determine the surface atomic ratio of Pt and Ru in conjunction with chronoamperometric experiments associated with a "Potential Step" program to obtain kinetics parameters. The Cu UPD measurement was performed with a published method (Green and A. Kucernak, J. Phys. Chem. B 2002 106, 1036-1047; Green and A. Kucernak, J. Phys. Chem. B 2002 106, 11446-11456). Briefly, all copper UPD experiments were carried out in 0.5M $H_2SO_4$ and 1 mM $CuSO_4$ solution. The electrode was modified with 120 ug/$cm^2$ of catalyst and was cycled (from 0.02 v to 0.85 v) in 0.5M $H_2SO_4$ at 10 mv/s. Then, the electrode was put into 0.5M $H_2SO_4$+1mM $CuSO_4$ solution and polarized at 0.3 V for 120 s. A linear voltammetric scan was then performed from the admission potential to a point at which all of the UPD copper had been oxidized at a scan rate of 10 mv/s. (The charge involved after background substation was named $Q_{Pt+Ru}$). Finally, the electrode was polarized at 1.05 v, at which all Ru on the surface could be oxidized in 120 s. The potential of the working electrode was then stepped to 0.3 v and stopped there for another 120 s. A linear volatmmertric scan at a scan rate of 10 mv/s was performed. (The charge involved after background substation was named $Q_{Pt}$). As a result, the Pt ratio on the surface of the catalyst could be calculated using formula (1):

$$\text{Pt \% (on the surface)} = Q_{Pt}/Q_{Pt+Ru} * 100\% \qquad (1)$$

The method was validated using a standard PtRu/C catalyst (E-TEK, 60%) and confirmed to be in valid.

Kinetics parameters during methanol oxidation on various catalysts were obtained from chronoamperometric experiments associated with the "Potential Step" program approach. The Potential Step program used in the chronoamperometric experiments was published by Herrero et al., J. Phys. Chem. B, 1994, 98, 5074-5083. It provides rates of the elementary processes avoiding the complications of CO poisoning. Methanol oxidation current was measured in a sequence of several sets of constant potential. The steps were applied starting from the predetermined, jumping to lower and going to upper potential biases for two cycles. The upper potential was set at 1.1 V (vs. RHE) where all organic residues on catalysts surface will be removed. The lower potential was set at the hydrogen UPD region. The instantaneous current (t=0) was recorded during the measurement. Tafel plots were obtained by plotting the instantaneous current versus the potential.

Example 6

X-Ray Diffraction (XRD) Characterization

Shown in FIG. 1 and summarized in Table 1 are the XRD patterns and lattice parameters of the prepared PtAu@Ru/C catalysts compared with a commercial PtRu/C catalyst (E-TEK). The Au-stabilized catalyst clearly exhibited a shift to lower 2θ values, indicating expansion of the Pt—Pt bonds due to alloying with Au. Further, the Au-stabilized catalysts exhibited subtle, but still observable reflections, which can be attributed to the hcp (hexagonal close-packed) phase of Ru. These data indicate that not only are the PtAu@Ru catalyst particles larger than the PtRu particles, but also that the Pt is alloyed with the Au, while the Ru is segregated away from the Pt and/or Au atoms. The data support a structure of the PtAu@Ru/C catalysts in which a PtAu alloy core is surrounded by a Ru shell. In addition, no well-defined diffraction peaks corresponding to metallic Au were seen. This indicates that the Au atoms are either in solid solution (as in a Pt—Au alloy), amorphous, or present as very tiny crystals, not detectable through XRD.

Example 7

X-Ray Spectroscopy Measurements

Figure 2A:
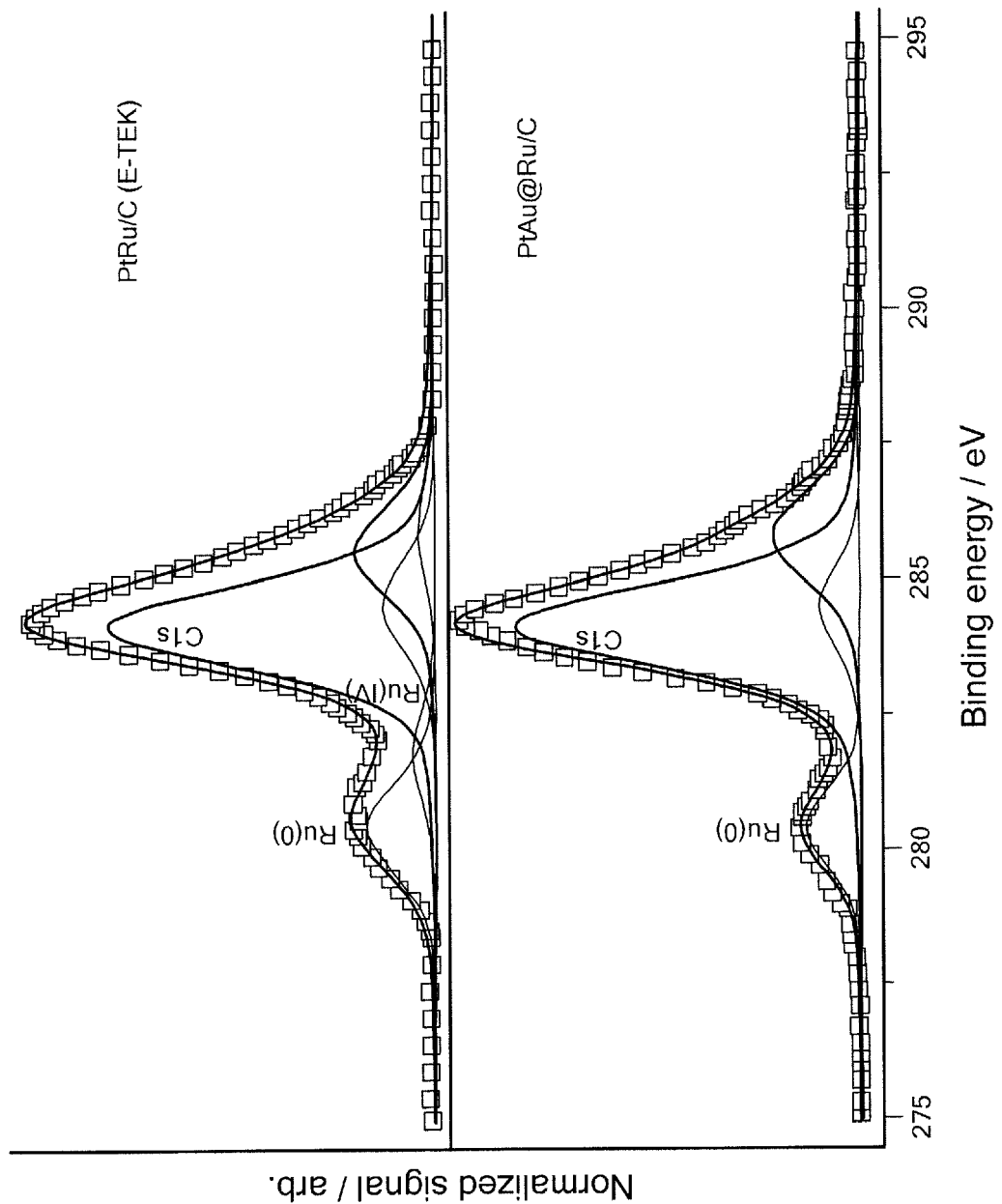
FIG. 2(a) shows XPS spectra of the Ru 3d core level from PtRu/C (E-TEK, 60%) and PtAu@Ru/C (60%, prepared by the microemulsion method).

X-ray photoelectron spectroscopy (XPS) data were collected to determine the surface composition of the PtAu@Ru and commercial PtRu alloys. XPS spectra of Ru 3d and C1s for PtRu/C (E-TEK) and PtAu@Ru/C catalysts are shown in FIG. 2(a). The two main peaks for Ru at ≈280.2 eV and for C at ≈284.5 eV are in line with those reported in the literature. The binding energy of Ru $3d_{5/2}$ was fitted with contributions of both Ru(0) and Ru(IV). There remains a relatively large amount of Ru (25.6%) in the 4+ valence state in the commercial PtRu/C. On the other hand, the Ru in PtAu@Ru/C sample is dominant with the 0 valence state. This indicates that the presence of additional Au help to prevent oxidation of Ru in the alloy.

Figure 2B:
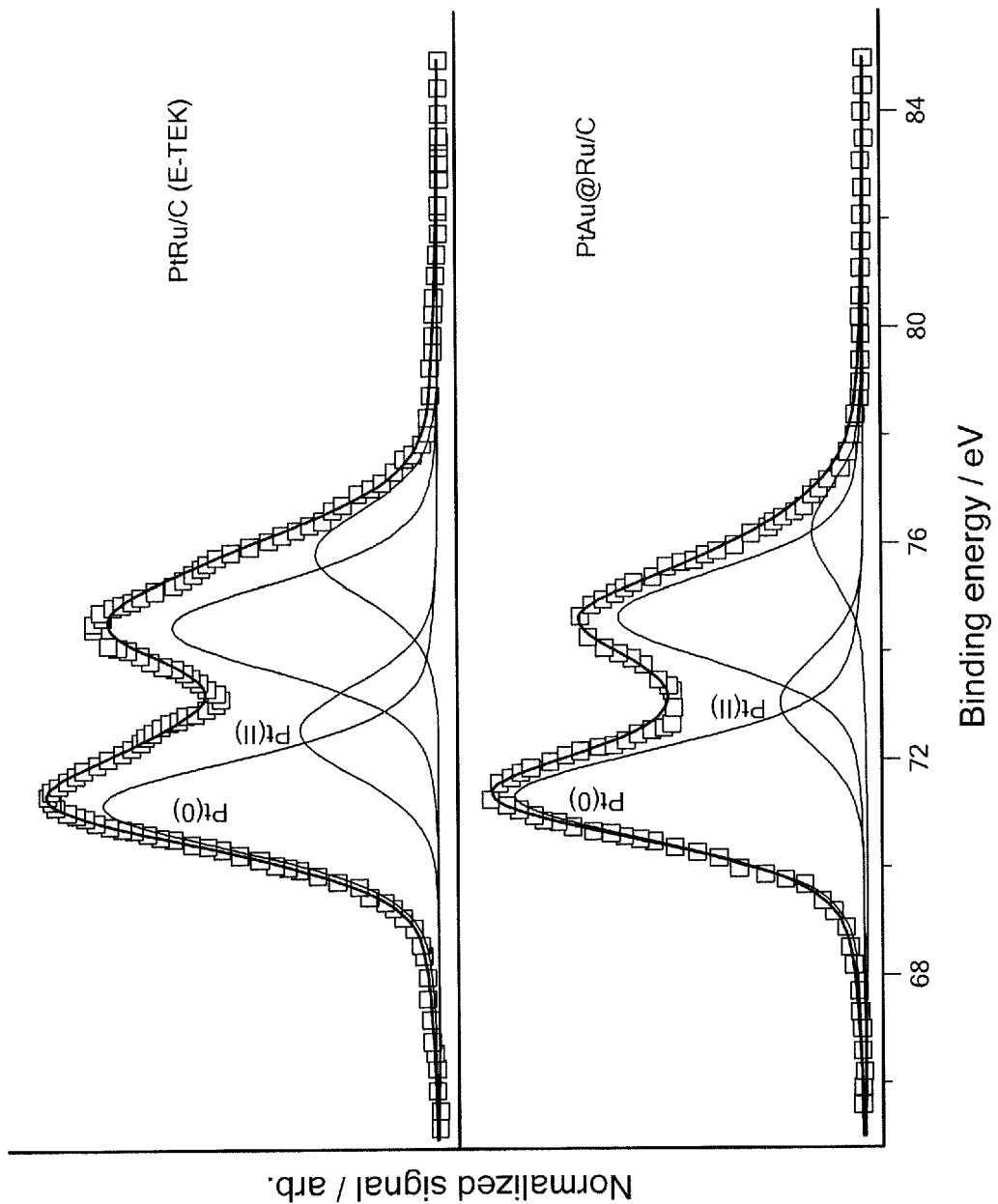
FIG. 2(b) shows XPS spectra of the Pt 4f core level for PtRu/C (E-TEK, 60%) and PtAu@Ru/C (60%, prepared by the microemulsion method).

The characteristic binding energies corresponding to the core levels of Pt $4f_{7/2}$ and $4f_{5/2}$ were used for fitting the Pt photoemissions curves shown in FIG. 2(b). Typically, the Pt(0) $4f_{7/2}$ and $4f_{5/2}$ binding energies appear at about 71.3 and 74.6 eV, respectively, and those of Pt(II) around 72.7 and 76.1 eV. Taking into account the ratio between the area of these Pt(0) and Pt(II) bands, it was deduced that the ratio of P(0) to Pt(II) is about equal in both of these electrocatalysts (80% Pt(0) to 20% Pt(II)).

Figure 2C:
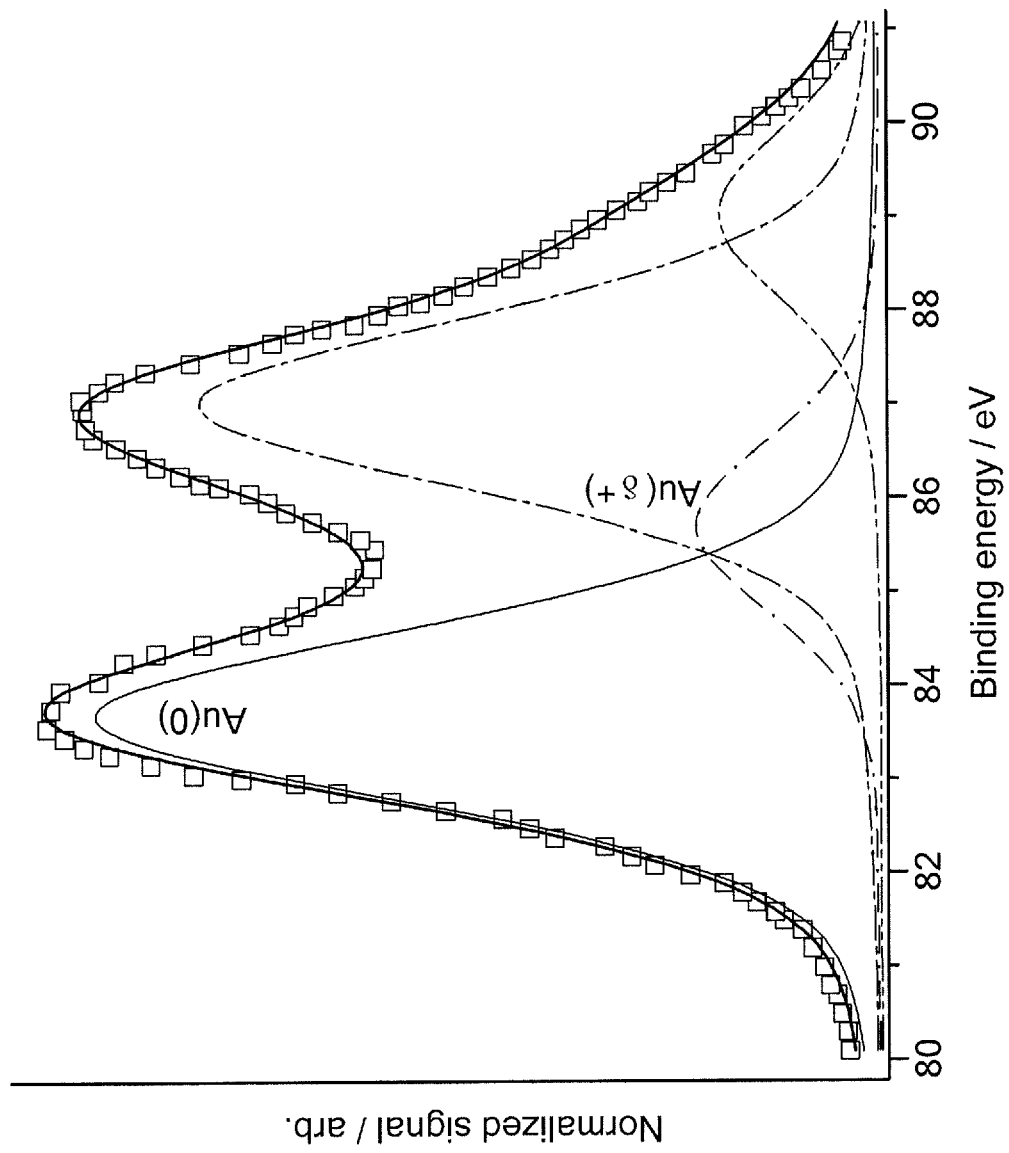
FIG. 2(c) shows an XPS spectrum of Au 4f core level for PtAu@Ru/C (60%, prepared by the microemulsion method).

The XPS spectra in the Au 4f core level region for PtAu@Ru/C electrocatalyst are shown in FIG. 2(c). The most intense peak at 82.6 eV can be attributed to the Au $4f_{7/2}$ binding energy of Au(0) while the lower band at 85.5 eV to $Au^{\delta+}$ species. From these bands it was deduced that the proportion of Au (0) to Pt+Ru is around 81%. The data on the PtAu@Ru catalysts thus shows that a significant fraction of the surface sites are Au, while Pt and Ru make up the rest of the surface, giving rise to an overall surface distribution of $X_{Pt}:X_{Ru}:X_{Au}$=8:3:6.

Figure 3A:
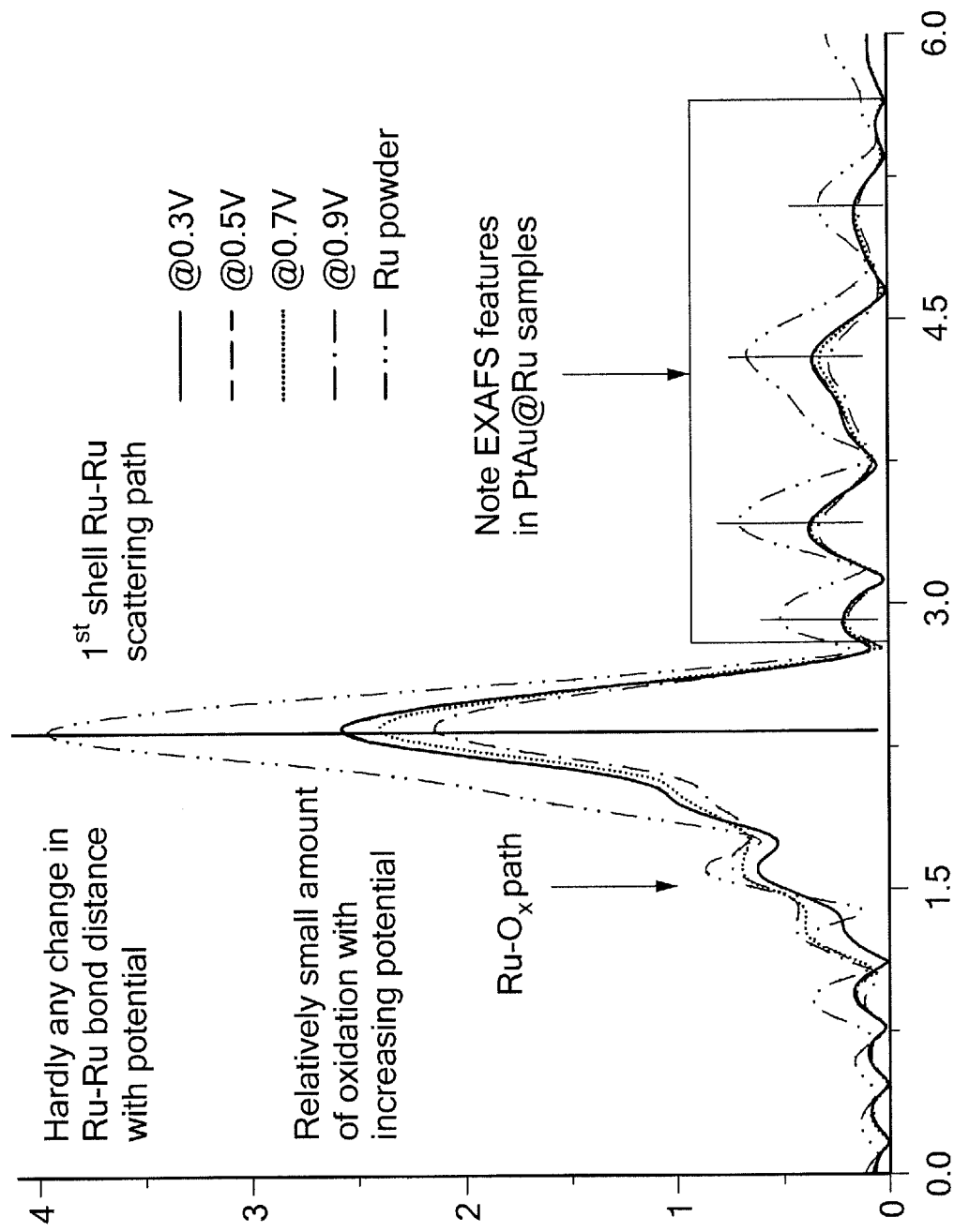
FIG. 3 shows pseudo-radial distribution functions for: (a) PtRu/C (E-TEK, 60%) and (b) PtAu@Ru/C (60%) obtained from the Ru k-edge Fourier transformed EXAFS data. The data were collected under in situ conditions at different potentials (vs. RHE) in 1M $HClO_4$.
Figure 3B:
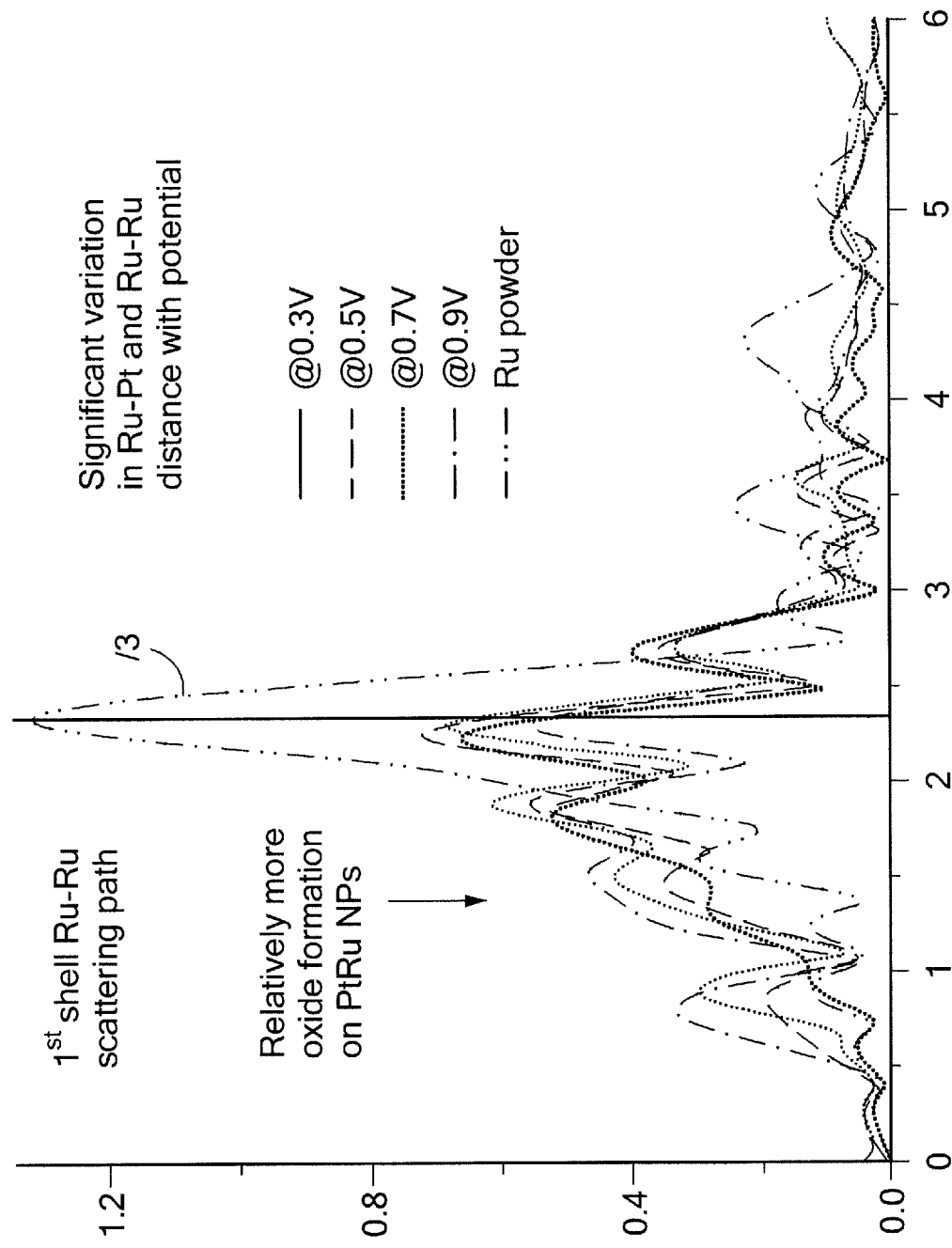

In order to obtain a more complete picture of the structure of the Au-stabilized PtAu@Ru catalyst, in situ X-ray absorption spectroscopy data were collected as a function of potential at the Ru—K edge. Shown in FIG. 3 are the Fourier-transformed $\chi^2(k)$ data that result in a pseudo-radial distribution in r-space. The most notable aspect of the data is that the Ru—Ru distance for the Au-stabilized catalyst (FIG. 3(a)) represented by the large peak centered around 0.23 nm is almost identical to the Ru—Ru distance seen in Ru powder (bulk, hcp Ru), and is in stark contrast to the typical distribution commonly seen in alloyed/well-mixed PtRu catalysts (FIG. 3(b)). Further, EXAFS fits carried out with an additional Ru-M (M=Pt or Au) scattering path did not yield any satisfactory fits with acceptable parameters. These results strongly support the XRD data and indicate that the Ru phase in the catalysts is mostly pure hcp Ru and is segregated from both the Pt and the Au. Also, on increasing the potential, the amount of oxide on the Ru, represented by the Ru—O scattering path (0.12 to 0.18 nm) was quite small when compared to that seen in the case of the PtRu/C (E-TEK) catalyst. Thus, the X-ray spectroscopy and X-ray diffraction data support a structure for the PtAu@Ru catalyst in which the Ru forms a shell around a Pt—Au core.

The r-space EXAFS data for the PtRu/C (E-TEK) sample, on the other hand, show features characteristic of a well-mixed alloy, and the fitting results yielding $N_{Ru-Ru}$ and $N_{Ru-Pt}$ values relatively close to each other. Further, it was found that unlike in the stable PtAu@Ru/C catalysts, the Ru—Ru bonds in the commercial sample are quite strained, having much larger values than those seen in the reference sample. This is in agreement with the XRD data shown in FIG. 1. In addition, the bond distance also changes quite noticeably with potential, which is another indication that the Au-stabilized nanoparticles according to the present invention are quite stable and undergo fewer structural/morphological changes during catalysis.

Example 8

Electron Microscopy Characterization

Figure 4A:
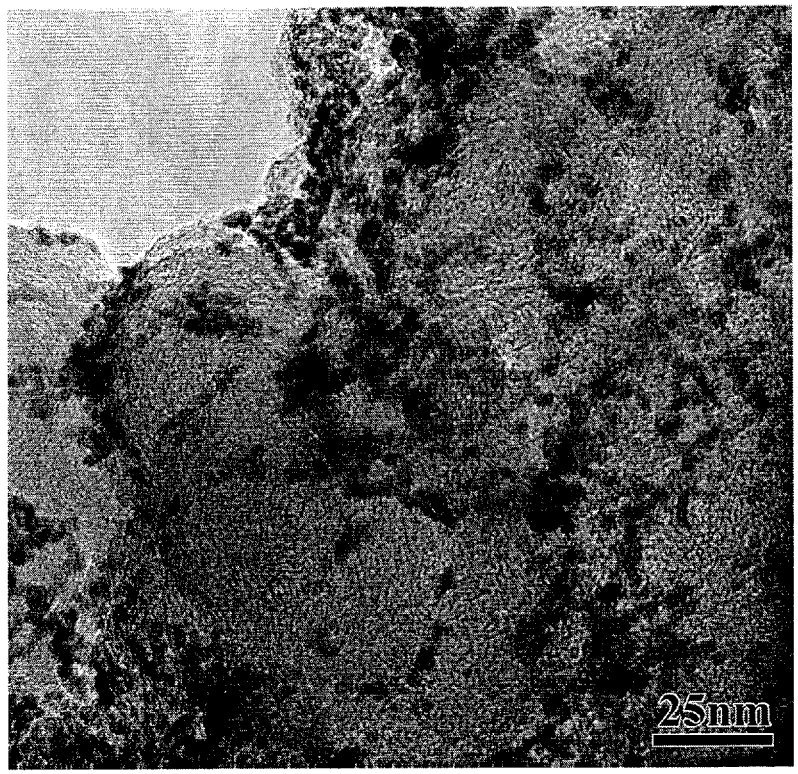
FIG. 4 shows TEM images of the following samples: (a) PtRu/C C (E-TEK 60%), (b) PtAu@Ru/C (60%, prepared by the microemulsion method), (c) single nanoparticle of PtAu@Ru/C (60%, prepared by the microemulsion method).
Figure 4B:
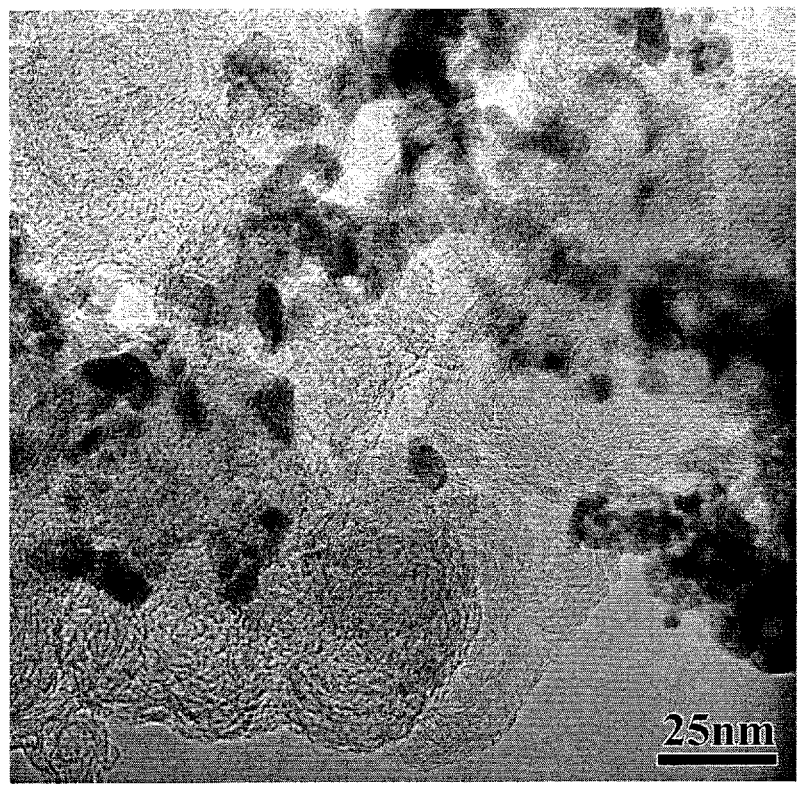
Figure 4C:
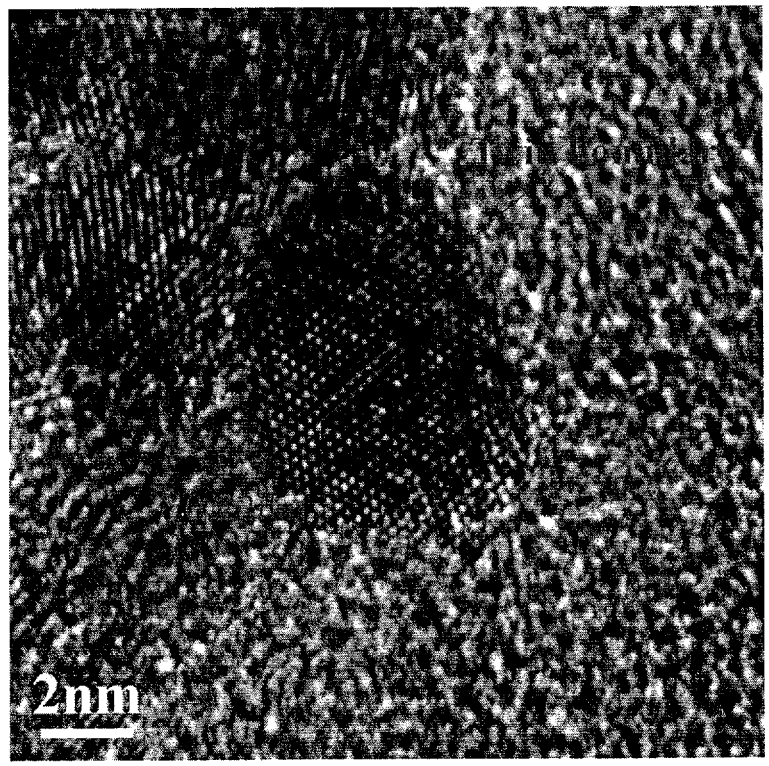

Characterization of the electrocatalysts by transmission electron microscopy (TEM) showed important differences between the nanostructures of the metal particles of the E-TEK PtRu/C (FIG. 4(a)) and that of a PtAu@Ru/C sample (FIG. 4(b)). Well-defined metallic particles were identified in the PtRu/C sample, and XEDS analysis of the metal particles confirmed that they were composed of both Pt and Ru. The average size of metallic particles in the PtRu/C sample was about 2 nm as observed from the particle size distribution (Figure S8(a)). In contrast, isolated particles were not found in the PtAu@Ru/C sample. Instead, the particles appeared agglomerated. XEDS analysis confirmed the presence of Pt, Au and Ru. In these agglomerates, with average particle size of 4.1 nm (Figure S8b), single nanoparticles could be still identified, as visible in the HRTEM image shown in FIG. 4c. The particle interior exhibited lattice fringes with a spacing of 0.22 nm, close to the {110} spacing of bulk Pt (0.2266 nm). However, the lattice fringes exhibited only weak contrast, even in the thicker region near the center, and appeared distorted. The particles tend to contain twin boundaries, as seen at the bottom right in FIG. 4c. The surface was apparently covered by a thin amorphous layer. The relatively strong contrast of this layer suggests that it contains heavier elements. This structure is consistent with maintaining the electrocatalytic activity of the metal phases and improving their stability under reaction conditions.

Example 9

Electrochemical Characterization

Figure 6:
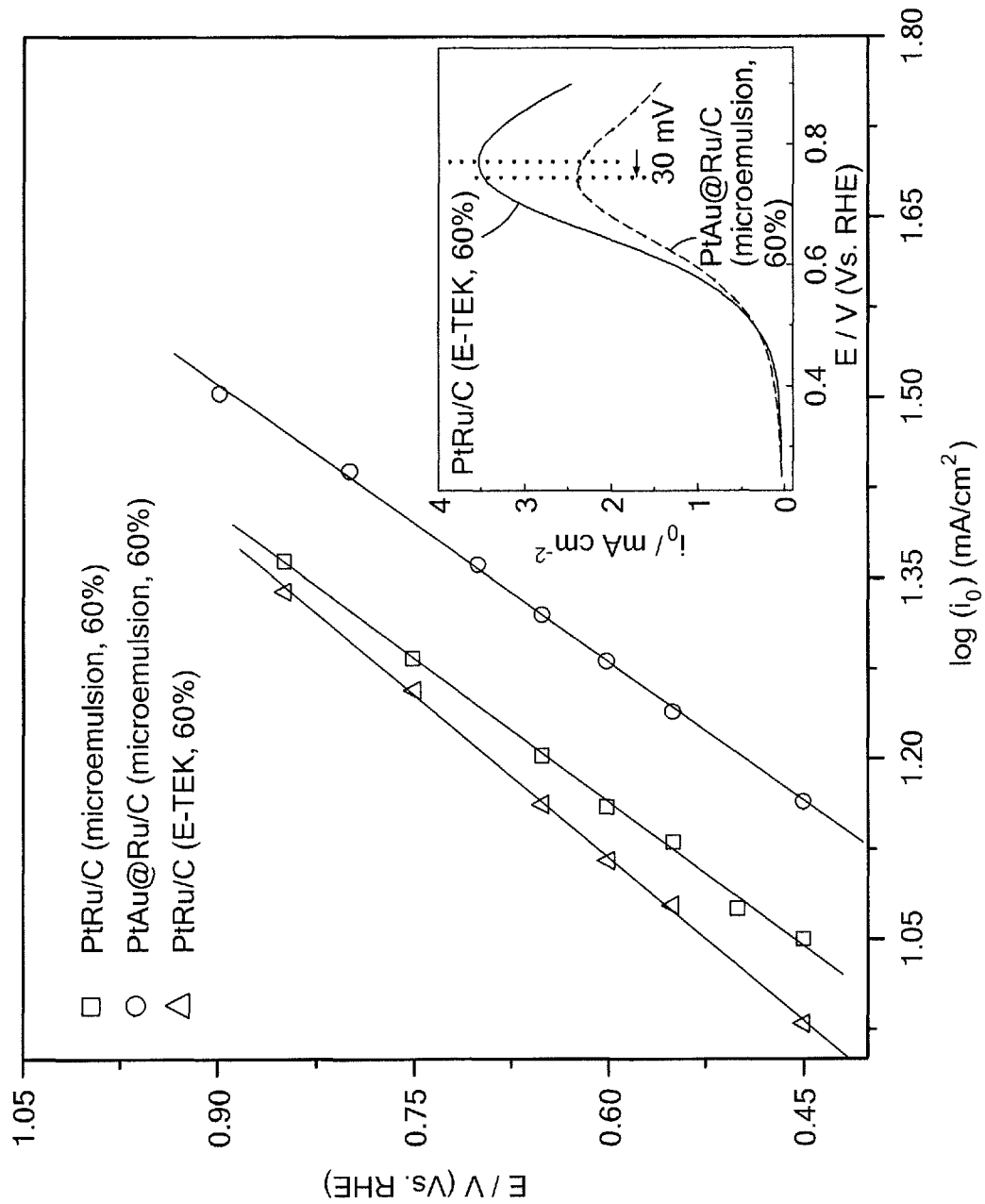
FIG. 6 shows a plot of log($i_{t=0}$) vs. electrode potential for methanol oxidation on PtRu/C (E-TEK 60%), PtRu/C (60%, produced by the microemulsion method), and PtAu@Ru/C (60%, by the microemulsion method) in 0.5M $H_2SO_4$. Methanol concentration was 1 M. The inset shows cyclic voltammograms for glassy carbon electrodes modified by PtRu/C (E-TEK 60%) and PtAu@Ru/C (60%, microemulsion method), in 0.5 M $H_2SO_4$+1 M methanol, Pt loading: 0.15 g/m$^2$, sweep rate: 10 mVs$^{-1}$. (room temperature).

The inset in FIG. 6 shows anodic scans of full cyclic voltammograms from electrooxidation of methanol over PtRu/C (E-TEK) and PtAu@Ru/C. The onset potential for oxidation on PtAu@Ru/C was shifted towards more negative values by as much as 50 mV when compared with that on PtRu/C (E-TEK). During the process of methanol electrooxidation, methanol decomposes on the catalyst surface at low potentials and forms intermediates, such as formic acid, formaldehyde, and CO. The anodic current increases due to oxidation of these intermediates by OH originating from water activation as the potential increases towards more positive values, and then decreases again after a peak potential because of losing active Pt sites due to oxygen adsorption, which blocks sites for the adsorption of intermediates. It is known that the peak potential for the oxidation of adsorbed intermediates from methanol depends significantly on the type of catalyst used. Thus, a 30 mV difference found in the position of the oxidation peak on PtRu/C (E-TEK) and PtAu@Ru suggests a different reaction pathway, one that results in a shift in the onset potential to lower potentials.

Example 10

Catalyst Stability Testing

Figure 7A:
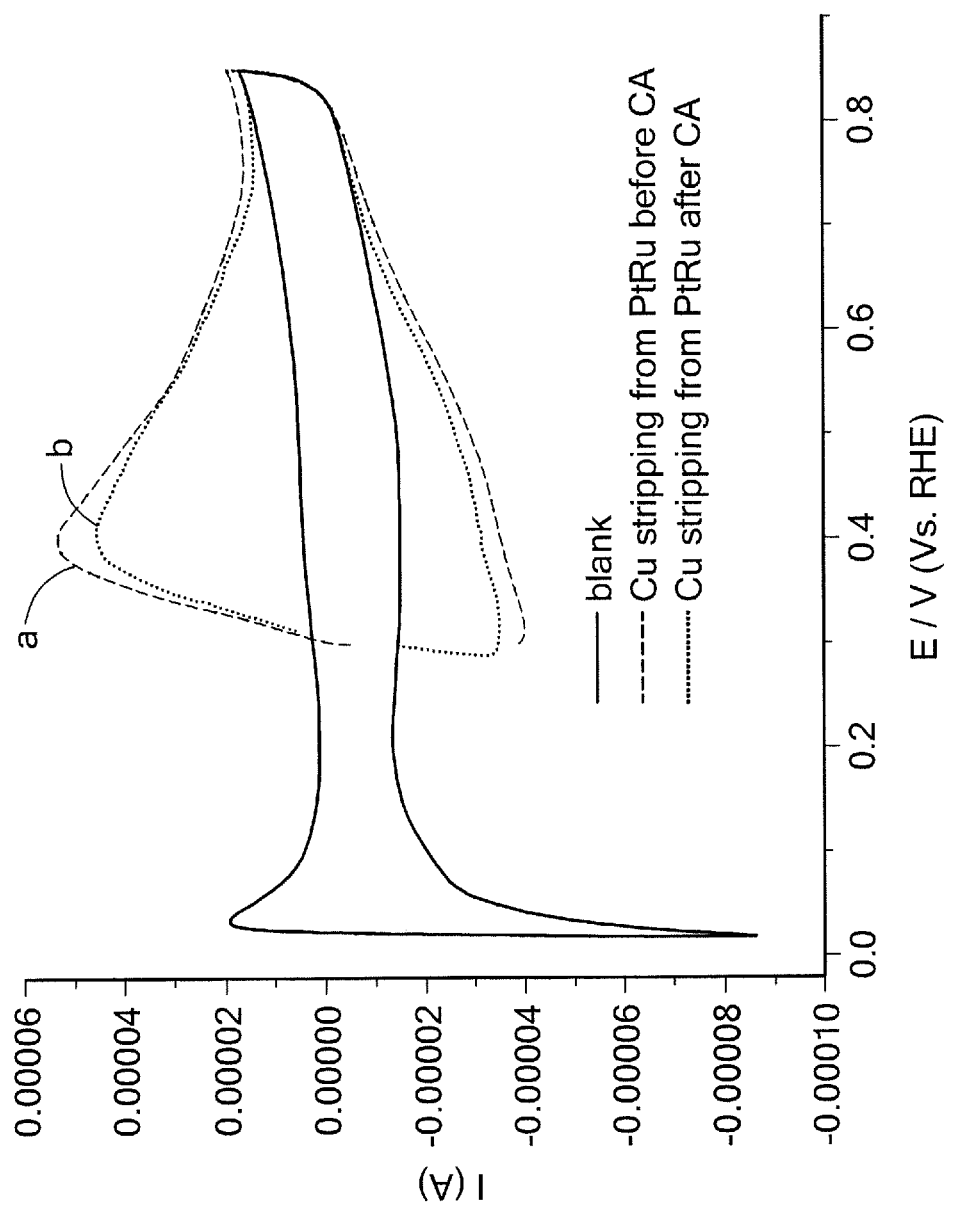
FIG. 7(a) shows background and upd stripping voltammetry for Cu deposited onto PtRu/C catalyst (E-TEK, 60%) bound to a glassy carbon electrode with Nafion. The blank was run in fresh 0.5M $H_2SO_4$. Curve (a) represents stripping voltammetry at fully reduced surface to obtain $Q_{Pt+Ru}$ before 86.4 ks (24 h) chronoamperometry test at room temperature. Curve (b) represents stripping voltammetry at fully reduced surface to obtain $Q_{Pt+Ru}$ after 86.4 ks chronoamperometry test at room temperature.
Figure 7B:
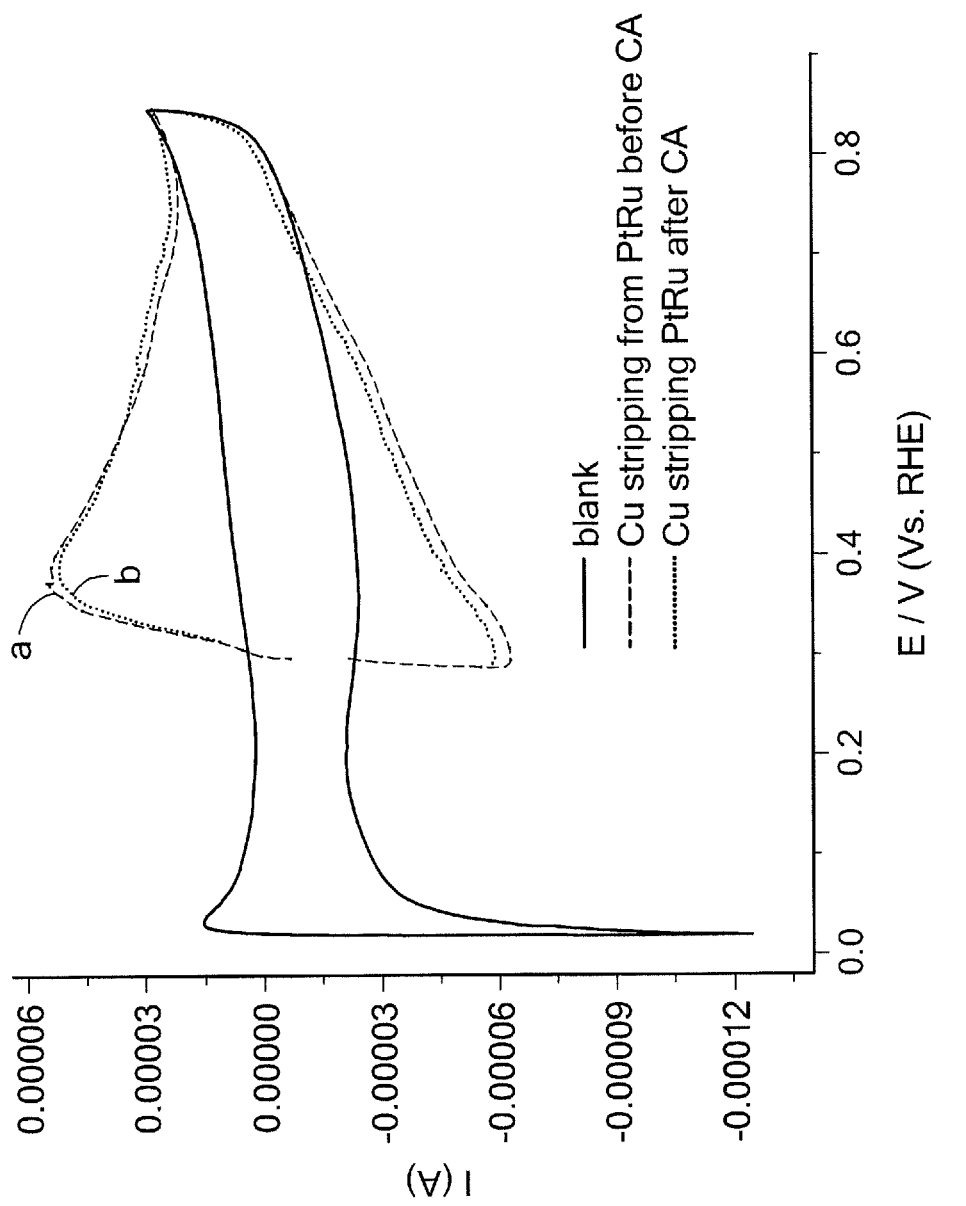
FIG. 7(b) shows background and upd stripping voltammetry for Cu deposited onto a PtAu@Ru/C catalyst (microemulsion, 60%) bound to a glassy carbon electrode with Nafion. The blank was run in fresh 0.5 M $H_2SO_4$. Curve (a) represents stripping voltammetry at fully reduced surface to obtain $Q_{Pt+Ru}$ before a 86.4 ks chronoamperometry test at room temperature. Curve (b) represents stripping voltammetry at the fully reduced surface to obtain $Q_{Pt+Ru}$ after 86.4 ks chronoamperometry at room temperature.

The stabilizing effect of Au in the PtAua@Ru/C catalyst was determined in an accelerated stability test by running chronoamperometric measurements (CA) at 0.55 V constantly for 86.4 ks (24 h). Cu UPD measurements were conducted before and after the long term CA test to determine loss of surface area of catalysts. FIG. 7 and Table 2 show only an insignificant change of electroactive surface area (ESA) in PtAu@Ru/C catalysts and the relative ratio of Pt and Ru after testing with an even higher current density for methanol oxidation. In contrast, the PtRu/C catalyst lost more than 10% of the ESA, apparently due to dissolution of Ru or Pt. The same experiments carried out at 323 K (50° C.) (Figure S10) showed no loss of ESA for the PtAu@Ru/C catalysts, providing evidence for the stabilizing effect of Au in this catalyst at elevated temperature.

Figure 8:
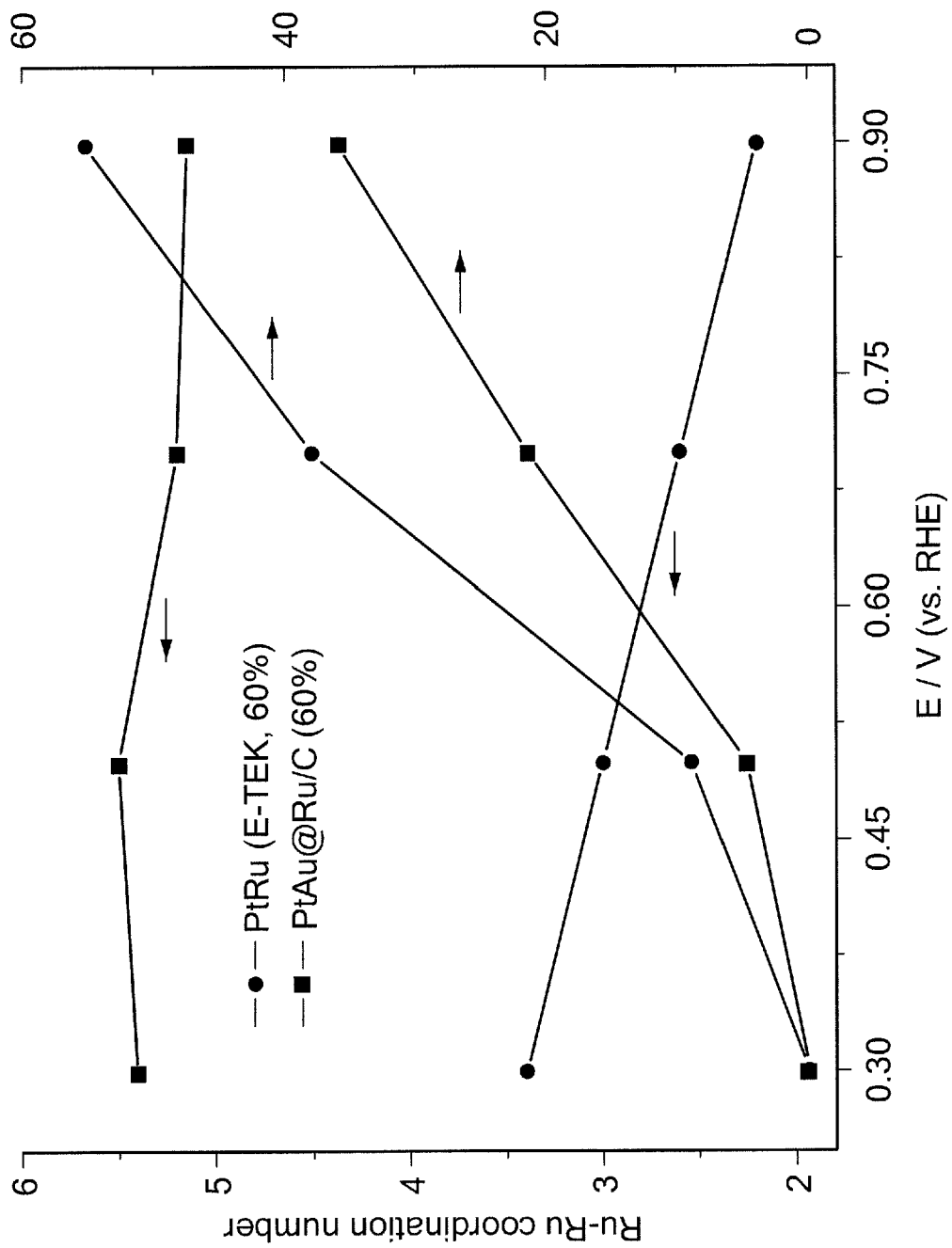
FIG. 8 shows a plot of oxide coverage and Ru—Ru bond distance for PtRu/C (E-TEK, 60%) and PtAu@Ru/C (microemulsion, 60%) as a function of electrode potential as determined by the Δμ-XANES and EXAFS data, respectively.

In order to decipher the stabilization effect of the Au on the PtRu catalysts, in situ X-ray absorption spectroscopy (XAS) data were collected as a function of potential at the Ru—K edge. In the XANES region, small changes in the white line intensity corresponding to the 1s→5p transition at 22.117 keV occurs on changing the oxidation state of Ru. Thus, by subtracting changes that occur in the bulk of the catalyst and using an appropriate reference spectrum, the potential-dependent oxide coverage on the surface was determined. Assuming that a full monolayer of oxide is formed at a potential of around 1.2 V, the data were analyzed to provide the fraction of oxide coverage on the surface of the two catalysts. The result is shown in FIG. 8. The oxide growth on the Au stabilized PtRu was lower compared to the PtRu catalyst, indicating an increase in Ru oxidation potential in the presence of Au. The Ru—Ru bond distance did not change notably in the PtAu@Ru/C catalyst, regardless of ascending potentials. The $\Delta\mu$ values were bulk averaged, and thus also included subsurface oxygen; these values therefore are not entirely surface-specific. However, the surface coverage values obtained from Cu UPD experiments are entirely attributable to the surface coverage.

As used herein, "consisting essentially of" does not exclude materials or steps that do not materially affect the basic and novel characteristics of the claim. Any recitation herein of the term "comprising", particularly in a description of components of a composition or in a description of elements of a device, can be exchanged with "consisting essentially of" or "consisting of".

While the present invention has been described in conjunction with certain preferred embodiments, one of ordinary skill, after reading the foregoing specification, will be able to effect various changes, substitutions of equivalents, and other alterations to the compositions and methods set forth herein. It is therefore intended that the protection granted by Letters Patent hereon be limited only by the definitions contained in the appended claims and equivalents thereof.

The invention claimed is:

1. A platinum alloy nanoparticulate catalyst for a fuel cell, comprising a plurality of core-shell nanoparticles attached to a plurality of carbon support particles, wherein the nanoparticles comprise:
   a core structure comprising an alloy of Pt and Au atoms;
   a first shell structure surrounding the core structure, wherein the first shell structure consists essentially of Ru atoms; and
   a second shell structure surrounding the first shell structure, wherein the second shell structure comprises an alloy of Pt, Ru, and Au atoms,
   wherein Au in the core structure and the second shell has an amorphous, non-crystalline structure.

2. The catalyst of claim 1 which catalyzes a fuel cell electrooxidation reaction.

3. The catalyst of claim 2, wherein the reaction is the electrooxidation of methanol.

4. The catalyst of claim 1, wherein the Au atoms in the core structure are distributed in solid solution.

5. The catalyst of claim 1, wherein the core structure is essentially devoid of Ru atoms.

6. The catalyst of claim 1, wherein the first shell is essentially devoid of Pt and Au atoms.

7. The catalyst of claim 1, wherein the overall ratio of Pt:Ru:Au of the core-shell nanoparticle is about 8:8:1.

8. The catalyst of claim 1, wherein the ratio of Pt:Au of the core is from about 1:2 to about 10:1.

9. The catalyst of claim 1, wherein the overall ratio of Pt:Ru in the core-shell nanoparticle is from about 2:1 to about 1:8.

10. The catalyst of claim 1, wherein the ratio of Pt:Ru:Au in the second shell is about 8:3:6.

11. The catalyst of claim 1, wherein the core structure is from about 1.5 to about 3 nm in diameter.

12. The catalyst of claim 1, wherein the thickness of the first shell is from about 1.5 to about 3 nm.

13. The catalyst of claim 1, wherein the thickness of the second shell is from about 0.1 to about 2 nm.

14. The catalyst of claim 1, wherein the core-shell nanoparticles have a mean diameter from about 1.6 nm to about 5 nm.

15. The catalyst of claim 1, wherein the carbon particles are have a mean diameter from about 1 to about 5 microns.

16. The catalyst of claim 1 which is attached to a solid support.

17. The catalyst of claim 1 which retains at least 98% of its electroactive surface area after 24 hours of electrochemical operation at a constant anodic overpotential in the range from 0.5 to 0.6 V as measured against a reference hydrogen electrode.

18. The catalyst of claim 1 which retains at least 98% of its electroactive surface area after 24 hours of electrochemical operation with potential cycling between 0.05 and 1.1 V as measured against a reference hydrogen electrode.

19. The catalyst of claim 1 which is resistant to dissolution of Ru from the catalyst as determined by the appearance of less than 1 μM dissolved Ru in the anode fuel stream.

20. The catalyst of claim 1, which catalyzes the anodic reaction in a direct methanol fuel cell.

21. A fuel cell comprising the catalyst of claim 1.

* * * * *